United States Patent
Goulet et al.

(10) Patent No.: US 11,557,786 B2
(45) Date of Patent: Jan. 17, 2023

(54) EXTENDING THE LIFETIME OF ORGANIC FLOW BATTERIES VIA REDOX STATE MANAGEMENT

(71) Applicant: President and Fellows of Harvard College, Cambridge, MA (US)

(72) Inventors: Marc-Antoni Goulet, Cambridge, MA (US); Roy G. Gordon, Cambridge, MA (US); Michael J. Aziz, Cambridge, MA (US); Liuchuan Tong, Seattle, WA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 17/281,767

(22) PCT Filed: Oct. 1, 2019

(86) PCT No.: PCT/US2019/053939
§ 371 (c)(1),
(2) Date: Mar. 31, 2021

(87) PCT Pub. No.: WO2020/072406
PCT Pub. Date: Apr. 9, 2020

(65) Prior Publication Data
US 2021/0391591 A1    Dec. 16, 2021

Related U.S. Application Data

(60) Provisional application No. 62/739,575, filed on Oct. 1, 2018.

(51) Int. Cl.
*H01M 8/18* (2006.01)
*H01M 8/22* (2006.01)

(52) U.S. Cl.
CPC .......... *H01M 8/225* (2013.01); *H01M 8/188* (2013.01)

(58) Field of Classification Search
CPC .......................... H01M 8/225; H01M 8/188
See application file for complete search history.

(56) References Cited

U.S. PATENT DOCUMENTS 3,238,066 A * 3/1966 Klass .................. H01M 8/20
429/417
3,288,641 A    11/1966 Rightmire
(Continued)

FOREIGN PATENT DOCUMENTS

CN    102035007 A    4/2011
CN    103000924 A    3/2013
(Continued)

OTHER PUBLICATIONS

Alt et al., "Evaluation of organic battery electrodes: voltammetric study of the redox behaviour of solid quinones," J Appl Electrochem. 2(3):193-200 (1972).
(Continued)

*Primary Examiner* — Alexander Usyatinsky
(74) *Attorney, Agent, or Firm* — Clark & Elbing LLP

(57) ABSTRACT

The invention provides flow batteries including an anthraquinone and methods of discharging the batteries that reduce loss of capacity. The loss of capacity of anthraquinones may be mitigated by controlling the state of charge and/or oxidizing the negolyte.

14 Claims, 16 Drawing Sheets

(56) References Cited

U.S. PATENT DOCUMENTS

| | | | |
|---|---|---|---|
| 3,300,342 | A | 1/1967 | Klass |
| 4,578,323 | A | 3/1986 | Hertl et al. |
| 4,652,355 | A | 3/1987 | Noding |
| 4,711,828 | A | 12/1987 | Ishida et al. |
| 4,924,015 | A | 5/1990 | Howell et al. |
| 6,020,105 | A | 2/2000 | Wariishi |
| 6,033,784 | A | 3/2000 | Jacobsen et al. |
| 7,056,418 | B2 | 6/2006 | Andoh et al. |
| 8,263,241 | B2 | 9/2012 | Ohtsuka et al. |
| 8,460,814 | B2 | 6/2013 | Deane et al. |
| 8,492,048 | B2 | 7/2013 | Knuckey et al. |
| 8,632,903 | B2 | 1/2014 | Dong et al. |
| 8,722,226 | B2 | 5/2014 | Chiang et al. |
| 8,785,023 | B2 | 7/2014 | Horne et al. |
| 8,906,529 | B2 | 12/2014 | Horne et al. |
| 8,993,183 | B2 | 3/2015 | Pham et al. |
| 9,614,245 | B2 | 4/2017 | Narayan et al. |
| 9,777,299 | B2 | 10/2017 | Amao et al. |
| 9,812,727 | B2 | 11/2017 | Stahl et al. |
| 9,837,679 | B2 | 12/2017 | Reece |
| 9,905,876 | B2 | 2/2018 | Schubert et al. |
| 9,929,425 | B2 | 3/2018 | Esswein et al. |
| 9,938,308 | B2 | 4/2018 | Millard |
| 9,966,622 | B2 | 5/2018 | Huskinson et al. |
| 10,040,763 | B2 | 8/2018 | Lin et al. |
| 10,153,651 | B2 | 12/2018 | Taylor et al. |
| 10,417,709 | B2 | 9/2019 | Hosman et al. |
| 10,589,231 | B2 | 3/2020 | Brozell |
| 10,840,532 | B2 | 11/2020 | Chen et al. |
| 10,847,829 | B2 | 11/2020 | Huskinson et al. |
| 10,934,258 | B2 | 3/2021 | Liu et al. |
| 2002/0088576 | A1 | 7/2002 | Andoh et al. |
| 2006/0194151 | A1 | 8/2006 | Inagaki et al. |
| 2007/0134520 | A1 | 6/2007 | Shimomura et al. |
| 2007/0184309 | A1 | 8/2007 | Gust Jr. et al. |
| 2009/0017379 | A1 | 1/2009 | Inatomi et al. |
| 2009/0094822 | A1 | 4/2009 | Ohtsuka et al. |
| 2010/0112393 | A1 | 5/2010 | Knuckey et al. |
| 2011/0027624 | A1 | 2/2011 | Deane et al. |
| 2011/0045332 | A1 | 2/2011 | Horne et al. |
| 2011/0189520 | A1 | 8/2011 | Carter et al. |
| 2011/0223450 | A1 | 9/2011 | Horne et al. |
| 2011/0284456 | A1 | 11/2011 | Brozell |
| 2013/0157162 | A1 | 6/2013 | Dong et al. |
| 2014/0051003 | A1 | 2/2014 | Esswein et al. |
| 2014/0186731 | A1 | 7/2014 | Pham et al. |
| 2014/0370403 | A1 | 12/2014 | Narayan et al. |
| 2015/0079497 | A1 | 3/2015 | Lavastre et al. |
| 2015/0104724 | A1 | 4/2015 | Chang et al. |
| 2015/0176037 | A1 | 6/2015 | Amao et al. |
| 2015/0207165 | A1 | 7/2015 | Schubert et al. |
| 2015/0243991 | A1 | 8/2015 | Huskinson et al. |
| 2016/0043423 | A1 | 2/2016 | Huskinson et al. |
| 2016/0105042 | A1* | 4/2016 | Taylor ............... H02J 7/007 320/134 |
| 2016/0229803 | A1 | 8/2016 | Lin et al. |
| 2016/0248114 | A1 | 8/2016 | Huskinson et al. |
| 2017/0046783 | A1 | 2/2017 | Hosman et al. |
| 2017/0047592 | A1 | 2/2017 | Surendranath et al. |
| 2017/0279148 | A1* | 9/2017 | Stahl ............... H01M 4/9041 |
| 2017/0291916 | A1 | 10/2017 | Millard |
| 2018/0048011 | A1* | 2/2018 | Aziz ............... H01M 8/188 |
| 2018/0241107 | A1* | 8/2018 | Su ............... H01M 4/368 |
| 2020/0373599 | A1 | 11/2020 | Gordon et al. |
| 2021/0009497 | A1 | 1/2021 | Aziz et al. |
| 2021/0083311 | A1 | 3/2021 | Huskinson et al. |

FOREIGN PATENT DOCUMENTS

| | | |
|---|---|---|
| CN | 103288886 A | 9/2013 |
| CN | 104882624 A | 9/2015 |
| CN | 105308785 A | 2/2016 |
| EP | 0298034 A2 | 1/1989 |
| EP | 0911893 A1 | 4/1999 |
| EP | 2772494 A1 | 9/2014 |
| JP | S5028645 A | 3/1975 |
| JP | S62-73577 A | 4/1987 |
| JP | H04-19966 A | 1/1992 |
| JP | H07-58625 B2 | 6/1995 |
| JP | H08-185868 A | 7/1996 |
| JP | H11-126610 A | 5/1999 |
| JP | 2002-100398 A | 4/2002 |
| KR | 10-2010-0040606 A | 4/2010 |
| WO | WO-2006/129635 A1 | 12/2006 |
| WO | WO-2011/131959 A1 | 10/2011 |
| WO | WO-2014/052682 A2 | 4/2014 |
| WO | WO-2014/204985 A1 | 12/2014 |
| WO | WO-2015/048550 A1 | 4/2015 |
| WO | WO-2014/052682 A3 | 8/2015 |
| WO | WO 2016/144909 * | 9/2016 |
| WO | WO-2016/156451 A1 | 10/2016 |
| WO | WO-2018/032003 A1 | 2/2018 |
| WO | WO-2018/146343 A1 | 8/2018 |
| WO | WO-2018/146344 A1 | 8/2018 |
| WO | WO-2020/072406 A2 | 4/2020 |

OTHER PUBLICATIONS

Beh et al., "A Neutral pH Aqueous Organic-Organometallic Redox Flow Battery with Extremely High Capacity Retention," ACS Energy Lett. 2(3):639-44 (2017).

Bird et al., "Electrochemistry of the viologens," Chem Soc Rev. 10:49-82 (1981).

Borisova et al., "Simple Preparative Synthesis of Spinochrome E, a Pigment from Sea Urchins of the Genus *Echinothrix*," Chem Nat Comp. 48(2):202-4 (2012).

Chen et al., "A quinone-bromide flow battery with 1 W/cm$^2$ power density," published in final form as: J Electrochem Soc. 163(1):A5010-3 (2016) (9 pages) (author manuscript).

Comninellis et al., "The electrochemical reduction of anthraquinone to anthrone in concentrated $H_2SO_4$," Journal of Applied Electrochemistry. 15(5):771-3 (1985) (Sep. 1985).

Conant et al., "Free and total energy changes in the reduction of quinones," J Am Chem Soc. 44(11):2480-93 (1922).

Conant et al., "Reduction potentials of quinones. I. The effect of the solvent on the potentials of certain benzoquinones," J Am Chem Soc. 45(9):2194-218 (1923).

Conant et al., "Reduction potentials of quinones. II. The potentials of certain derivatives of benzoquinone, naphthoquinone and anthraquinone," J Am Chem Soc. 46(8):1858-1881 (1924).

Costentin et al., "Electrochemical approach to the mechanistic study of proton-coupled electron transfer," Chem Rev. 108(7):2145-79 (2008).

Darling et al. "Transport property requirements for flow battery separators," J Electrochem Soc. 163(1):A5029-40 (2016) (13 pages).

Diaz, "Analytical applications of 1,10-anthraquinones: A review," Talanta. 38(6):571-88 (1991).

EMD Millipore Corporation "Pyridinium chloride for synthesis—Material Safety Data Sheet," revised Aug. 22, 2013 (9 pages).

Er et al., "Computational design of molecules for an all-quinone redox flow battery," Chem Sci. 6(2):885-93 (2015) (10 pages).

Erlebacher et al., "Evolution of nanoporosity in dealloying," manuscript, published in final edited form as: Nature. 410(6827):450-3 (2001) (10 pages).

Gerhardt et al., "Anthraquinone derivatives in aqueous flow batteries," Adv Energy Mater. 7(8):1601488 (2017) (9 pages).

Goulet et al., "Flow battery molecular reactant stability determined by symmetric cell cycling methods," J Electrochem Soc. 165(7):A1466-77 (2018) (May 15, 2018) (23 pages).

Hori, Chapter 3: Electrochemical CO2 reduction on metal electrodes. *Modern aspects of electrochemistry*, No. 42. C. Vayenas et al., 89-189 (2008).

Hu et al., "Long-Cycling Aqueous Organic Redox Flow Battery (AORFB) toward Sustainable and Safe Energy Storage," J Am Chem Soc. 139(3):1207-1214 (2017) (22 pages).

Hull et al., "Reversible hydrogen storage using CO2 and a proton-switchable iridium catalyst in aqueous media under mild temperatures and pressures," Nat Chem. 4(5):383-8 (2012).

(56) References Cited

OTHER PUBLICATIONS

Huynh et al., "Quinone 1 e- and 2 e-/2 H+ reduction potentials: identification and analysis of deviations from systematic scaling relationships," available in PMC Oct. 30, 2018, published in final edited form as: J Am Chem Soc. 138(49):15903-10 (2016) (23 pages).
Huskinson et al., "A high power density, high efficiency hydrogen-chlorine regenerative fuel cell with a low precious metal content catalyst," arXiv:1206.2883 (2012).
Huskinson et al., "A metal-free organic-inorganic aqueous flow battery," Nature. 505(7482):195-8 (2014) (16 pages).
Huskinson et al., "Cycling of a quinone-bromide flow battery for large-scale electrochemical energy storage," published in final form as: ECS Trans. 61(37):27-30 (2014) (4 pages) (author manuscript).
Huskinson et al., "Novel quinone-based couples for flow batteries," published in final form as: ECS Trans. 53(7):101-5 (2013) (5 pages) (author manuscript).
International Search Report and Written Opinion for International Application No. PCT/US2019/053939, dated Mar. 26, 2020 (17 pages).
Karandur et al. "Solubility and aggregation of $Gly_5$ in water," J Phys Chem B. 118(32):9565-72 (2014).
Khataee et al., "Differential pH as a method for increasing cell potential in organic aqueous flow batteries," J Mater Chem A. 5(41):21875-82 (2017).
Knox et al., "134. Ferrocene derivatives. Part VII. Some sulphur derivatives," J Chem Soc. 692-96 (1958).
Krishnan et al., "Reduction potentials for 2,2'-bipyridine and 1,10-phenanthroline couples in aqueous solutions," J Am Chem Soc. 105(17):5617-23 (1983).
Kwabi et al., "Alkaline quinone flow battery with long lifetime at pH 12," Joule. 2:1894-1906 (2018) (Sep. 19, 2018) (14 pages).
Li et al., "$CO_2$ reduction at low overpotential on Cu electrodes resulting from the reduction of thick $Cu_2O$ films," J Am Chem Soc. 134(17):7231-4 (2012).
Lin et al., "A redox-flow battery with an alloxazine-based organic electrolyte," Nature Energy. 1(9):16102 (2016) (38 pages).
Lin et al., "Alkaline quinone flow battery," published in final edited form as: Science. 349(6255):1529-32 (2015) (27 pages).
Lin et al., "Alkaline quinone flow battery," Science. 349(6255):1529-32 (2015) (28 pages).
Liu et al., "A Total Organic Aqueous Redox Flow Battery Employing a Low Cost and Sustainable Methyl Viologen Anolyte and 4-HO-TEMPO Catholyte," Adv Energy Mater. 6(3):1501449 (2016) (8 pages).
Mondal et al. "Alloy oxide electrocatalysts for regenerative hydrogen-halogen fuel cell," Mater Res Soc Symp Proc. GG10.9:1311 (2010) (6 pages).
Mortimer et al., "Electrochromic materials," Chem Soc Rev. 26(3):147-56 (1997).
National Center for Biotechnology Information. "PubChem substance record for SID 234866994, SCHEMBL9466422, source: SureChEMBL." PubChem, <https://pubchem.ncbi.nlm.nih.gov/substance/234866994>, Available Feb. 13, 2015, Accessed Dec. 2, 2020 (7 pages).
Nawar et al., "Benzoquinone-hydroquinone couple for flow battery," published in final form as: MRS Proceedings. 1491:mrsf12-1491 (2013) (6 pages) (author manuscript).
Nielson et al., "Electron Self-Exchange Kinetics for a Water-Soluble Ferrocenium/Ferrocene Couple: Rate Modulation via Charge Dependent Calix[6]arene-p-sulfonate Encapsulation," Inorg Chem. 35(5):1402-4(1996).
Partial Supplementary European Search Report for European Application No. 13841221.8, dated Jun. 30, 2016 (8 pages).
Pubchem, Substance Record for SID 142148551, <https://pubchem.ncbi.nlm.nih.gov/substance/142148551 #section=Top>, available date Aug. 20, 2012, retrieved Jun. 20, 2016 (6 pages).
Quan et al., "Voltammetry of quinones in unbuffered aqueous solution: reassessing the roles of proton transfer and hydrogen bonding in the aqueous electrochemistry of quinones," J Am Chem Soc. 129(42):12847-56 (2007).
Rasmussen, "A single substance organic redox flow battery," ESS, 2012 (Poster presentation).
Rieger et al., "Methyl viologen reactions. 5. Rates and mechanism of cation-radical formation in aqueous base," J Org Chem. 53(7):1481-85 (1988).
Search Report for Canadian Application No. 2,885,929, dated Nov. 13, 2020 (3 pages).
Shi et al., "1,1',8,8'-Tetramethoxy-10,10'-bianthrone," Acta Cryst. 60:o2275-o2277 (2004) (Dec. 2004) (7 pages).
Smith et al., "The pH-Rate Profile for the Hydrolysis of a Peptide Bond," J Am Chem Soc. 120(35):8910-13(1998).
Tabor et al., "Supplementary Material to 'Theoretical and Experimental Investigation of the Stability Limits of Quinones in Aqueous Media: Implications for Organic Aqueous Redox Flow Batteries,'" ChemRxiv. DOI: 10.26434/chemrxiv.6990053.v2 (2018) (Aug. 22, 2018) (19 pages).
Tao et al., "Anticancer Effect and Structure-Activity Analysis of Marine Products Isolated from Metabolites of Mangrove Fungi in the South China Sea," Mar Drugs. 8(4):1094-105 (2010).
Wang et al., "Anthraquinone with tailored structure for a nonaqueous metal-organic redox flow battery," Chem Commun (Camb). 48(53):6669-71 (2012).
Weber et al., "Redox flow batteries: a review," J Appl Electrochem 41:1137-64 (2011).
Wendlandt, Chapter 14: Quinones in Hydrogen Peroxide Synthesis and Catalytic Aerobic Oxidation Reactions. *Liquid Phase Aerobic Oxidation Catalysis: Industrial Applications and Academic Perspectives, First Edition.* Wiley-VCH Verlag GmbH & Co. KGaA., 221-237 (2016) (Aug. 17, 2016).
Xu et al., "A study of tiron in aqueous solutions for redox flow battery application," Electrochimica Acta. 55:715-20 (2010).
Xu et al., "Novel organic redox flow batteries using soluble quinonoid compounds as positive materials," IEEE. (4 pages) (2009).
Yang et al., "High-performance aqueous organic flow battery with quinone-based redox couples at both electrodes," J Electrochem Soc. 163(7):A1442-49 (2016) (9 pages).
Yao et al., "High-capacity organic positive-electrode material based on a benzoquinone derivative for use in rechargeable lithium batteries," J Power Sources. 195(24): 8336-40 (2010).
Extended European Search Report for European Patent Application No. 19869728.6, dated Oct. 20, 2022 (7 pages).

* cited by examiner

EXTENDING THE LIFETIME OF ORGANIC FLOW BATTERIES VIA REDOX STATE MANAGEMENT

STATEMENT REGARDING FEDERALLY SPONSORED RESEARCH

This invention was made with government support under DE-AR-0000348 and DE-AC05-76RL01830 awarded by the U.S. Department of Energy. The government has certain rights in the invention.

BACKGROUND OF THE INVENTION

The cost of electricity generated from renewable sources such as the sun and wind has become competitive with electricity derived from fossil fuels. Nonetheless, the widespread adoption of intermittent renewable electricity requires new methods for the reliable storage and delivery of electricity over long periods when these sources are unavailable for generation. Redox flow batteries (RFBs), whose energy and power capabilities can be scaled independently, may enable cost-effective long-duration discharge.

The all-vanadium redox flow battery chemistry is currently the most technologically developed but may not access much of the grid storage market due to electrolyte cost constraints. Emerging organic electrolytes comprising cheaper earth-abundant elements may address this limitation. However, organic electrolytes are more prone to molecular decomposition, which can lead to a progressive loss of charge storage capacity. Although several studies have proposed decomposition pathways, such as Michael addition, nucleophilic substitution, electrophilic aromatic substitution, ring-opening, and disproportionation, none of these pathways have been linked quantitatively to capacity fade.

SUMMARY OF THE INVENTION

The invention features batteries exhibiting reduced loss of capacity over time and methods related thereto.

In an aspect, the invention provides a method of discharging a battery by providing a flow battery including a negolyte including an anthrahydroquinone in aqueous solution or suspension in contact with a first electrode, a posolyte including a redox active species in contact with a second electrode, and a barrier separating the negolyte and posolyte; and discharging the flow battery so that that anthrahydroquinone is oxidized to an anthraquinone and the redox active species is reduced, wherein the state of charge of the anthrahydroquinone at the end of charging is less than 100%, e.g., between 45-95%. The method may further include providing an oxidizing agent to the discharged negolyte.

In an aspect, the invention provides a method of discharging a battery by providing a flow battery including a negolyte including an anthrahydroquinone in aqueous solution or suspension in contact with a first electrode, a posolyte including a redox active species in contact with a second electrode, and a barrier separating the negolyte and posolyte; discharging the flow battery so that that anthrahydroquinone is oxidized to an anthraquinone and the redox active species is reduced; and providing an oxidizing agent to the discharged negolyte.

In embodiments of the methods described herein, the anthraquinone is of formula (I):

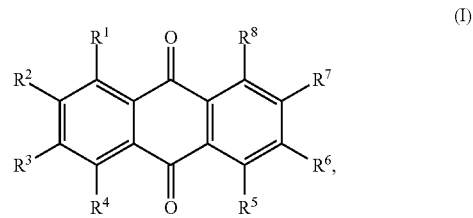

wherein each of $R^1$, $R^2$, $R^3$, $R^4$, $R^5$, $R^6$, $R^7$ and $R^8$ is independently selected from H; halo; optionally substituted $C_{1-6}$ alkyl; oxo; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; —CN; —NO$_2$; —OR$_a$; —SR$_a$; —N(R$_a$)$_2$ (e.g., amino); —C(=O)R$_a$; —C(=O)OR$_a$ (e.g., carboxyl); —S(=O)$_2$R$_a$; —S(=O)$_2$OR$_a$ (e.g., SO$_3$H); —P(=O)R$_{a2}$; and —P(=O)(OR$_a$)$_2$ (e.g., phosphonyl or phosphoryl); or any two adjacent groups selected from $R^1$, $R^2$, $R^3$, and $R^4$ are joined to form an optionally substituted 3-6 membered ring, or an ion thereof, wherein each $R_a$ is independently H; $C_{1-6}$ alkyl; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; an oxygen protecting group; or a nitrogen protecting group. An exemplary anthraquinone is 2,6-dihydroxy-9,10-anthraquinone.

In embodiments of the methods described herein, the redox active species includes bromine, chlorine, iodine, molecular oxygen, vanadium, chromium, cobalt, iron, aluminum, manganese, cobalt, nickel, copper, or lead.

In embodiments of the methods described herein, the oxidizing agent is molecular oxygen, e.g., provided in gaseous form, such as air. In embodiments of the methods described herein, the oxidizing agent is provided after each discharge or the oxidizing agent is not provided until after at least 10 cycles.

In embodiments of the methods described herein, the battery is cycled for at least 100 times.

In an aspect, the invention provides a flow battery including i) a negolyte including an anthrahydroquinone in aqueous solution or suspension in contact with a first electrode; ii) a posolyte including a redox active species in contact with a second electrode; iii) a barrier separating the negolyte and posolyte; and iv) a controller to limit the charging of the anthrahydroquinone to less than 100%, e.g., between 45-95%. In embodiments, the battery further includes a source of oxidizing agent in fluid communication with the negolyte and/or a gas dispersion element in the negolyte.

In an aspect, the invention provides a flow battery including i) a negolyte including an anthrahydroquinone in aqueous solution or suspension in contact with a first electrode; ii) a posolyte including a redox active species in contact with a second electrode; iii) a barrier separating the negolyte and posolyte; and iv) a source of oxidizing agent in fluid communication with the negolyte and/or a gas dispersion element in the negolyte.

In embodiments of the batteries described herein, the anthraquinone is of formula (I):

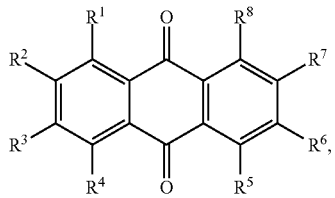

wherein each of $R^1$, $R^2$, $R^3$, $R^4$, $R^5$, $R^6$, $R^7$ and $R^8$ is independently selected from H; halo; optionally substituted $C_{1-6}$ alkyl; oxo; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; —CN; —NO$_2$; —OR$_a$; —SR$_a$; —N(R$_a$)$_2$ (e.g., amino); —C(=O)R$_a$; —C(=O)OR$_a$ (e.g., carboxyl); —S(=O)$_2$R$_a$; —S(=O)$_2$OR$_a$ (e.g., SO$_3$H); —P(=O)R$_{a2}$; and —P(=O)(OR$_a$)$_2$ (e.g., phosphonyl or phosphoryl); or any two adjacent groups selected from $R^1$, $R^2$, $R^3$, and $R^4$ are joined to form an optionally substituted 3-6 membered ring, or an ion thereof, wherein each R$_a$ is independently H; $C_{1-6}$ alkyl; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; an oxygen protecting group; or a nitrogen protecting group. An exemplary anthraquinone is 2,6-dihydroxy-9,10-anthraquinone.

In embodiments of the batteries described herein, the redox active species includes bromine, chlorine, iodine, molecular oxygen, vanadium, chromium, cobalt, iron, aluminum, manganese, cobalt, nickel, copper, or lead.

In embodiments of the batteries described herein, the oxidizing agent is molecular oxygen, e.g., in gaseous form, such as air.

In an aspect, the invention provides a method of reducing loss of capacity (e.g., less than 1% per day) in a flow battery by providing a flow battery including a negolyte in aqueous solution or suspension in contact with a first electrode, a posolyte in contact with a second electrode, and a barrier separating the negolyte and posolyte; and charging the negolyte to less than 100% (e.g., between 45-95%) before discharge or oxidizing the negolyte after discharge.

In embodiments of this method, the negolyte includes an organic or organometallic redox active compound, e.g., an anthraquinone, such as the anthraquinone of formula (I):

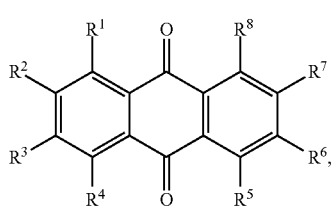

wherein each of $R^1$, $R^2$, $R^3$, $R^4$, $R^5$, $R^6$, $R^7$ and $R^8$ is independently selected from H; halo; optionally substituted $C_{1-6}$ alkyl; oxo; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; —CN; —NO$_2$; —OR$_a$; —SR$_a$; —N(R$_a$)$_2$ (e.g., amino); —C(=O)R$_a$; —C(=O)OR$_a$ (e.g., carboxyl); —S(=O)$_2$R$_a$; —S(=O)$_2$OR$_a$ (e.g., SO$_3$H); —P(=O)R$_{a2}$; and —P(=O)(OR$_a$)$_2$ (e.g., phosphonyl or phosphoryl); or any two adjacent groups selected from $R^1$, $R^2$, $R^3$, and $R^4$ are joined to form an optionally substituted 3-6 membered ring, or an ion thereof, wherein each R$_a$ is independently H; $C_{1-6}$ alkyl; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; an oxygen protecting group; or a nitrogen protecting group. An exemplary anthraquinone is 2,6-dihydroxy-9,10-anthraquinone.

In embodiments of this method, the posolyte includes a redox active species including bromine, chlorine, iodine, molecular oxygen, vanadium, chromium, cobalt, iron, aluminum, manganese, cobalt, nickel, copper, or lead.

In embodiments of this method, the oxidizing agent is molecular oxygen, e.g., in gaseous form, such as air. In embodiments of this method, the oxidizing agent is provided after each discharge.

By "alkyl" is meant straight chain or branched saturated groups from 1 to 6 carbons. Alkyl groups are exemplified by methyl, ethyl, n- and iso-propyl, n-, sec-, iso- and tert-butyl, neopentyl, and the like, and may be optionally substituted with one or more, substituents.

By "alkoxy" is meant a group of formula —OR, wherein R is an alkyl group, as defined herein.

By "alkyl thio" is meant —S—R, where R is an alkyl group, as defined herein.

By "alkyl ester" is meant —COOR, where R is an alkyl group, as defined herein.

By "aryl" is meant an aromatic cyclic group in which the ring atoms are all carbon. Exemplary aryl groups include phenyl, naphthyl, and anthracenyl. Aryl groups may be optionally substituted with one or more substituents.

By "carbocyclyl" is meant a non-aromatic cyclic group in which the ring atoms are all carbon. Exemplary carbocyclyl groups include cyclopropyl, cyclobutyl, cyclopentyl, cyclohexyl, cycloheptyl, and cyclooctyl. Carbocyclyl groups may be optionally substituted with one or more substituents.

By "halo" is meant, fluoro, chloro, bromo, or iodo.

By "hydroxyl" is meant —OH. An exemplary ion of hydroxyl is —O$^-$.

By "amino" is meant —NH$_2$. An exemplary ion of amino is —NH$_3^+$.

By "nitro" is meant —NO$_2$.

By "carboxyl" is meant —COOH. An exemplary ion of carboxyl is —COO$^-$.

By "phosphoryl" is meant —PO$_3$H$_2$. Exemplary ions of phosphoryl are —PO$_3$H$^-$ and —PO$_3^{2-}$.

By "phosphonyl" is meant —PO$_3$R$_2$, wherein each R is H or alkyl, provided at least one R is alkyl, as defined herein. An exemplary ion of phosphoryl is —PO$_3$R$^-$.

By "oxo" is meant =O.

By "sulfonyl" is meant —SO$_3$H. An exemplary ion of sulfonyl is —SO$_3^-$.

By "thiol" is meant —SH.

By "heteroaryl" is meant an aromatic cyclic group in which the ring atoms include at least one carbon and at least one O, N, or S atom, provided that at least three ring atoms are present. Exemplary heteroaryl groups include oxazolyl, isoxazolyl, tetrazolyl, pyridyl, thienyl, furyl, pyrrolyl, imidazolyl, pyrimidinyl, thiazolyl, indolyl, quinolinyl, isoquinolinyl, benzofuryl, benzothienyl, pyrazolyl, pyrazinyl, pyridazinyl, isothiazolyl, benzimidazolyl, benzothiazolyl, benzoxazolyl, oxadiazolyl, thiadiazolyl, and triazolyl. Heteroaryl groups may be optionally substituted with one or more substituents.

By "heterocyclyl" is meant a non-aromatic cyclic group in which the ring atoms include at least one carbon and at least one O, N, or S atom, provided that at least three ring atoms are present. Exemplary heterocyclyl groups include epoxide, thiiranyl, aziridinyl, azetidinyl, thietanyl, dioxetanyl, morpholinyl, thiomorpholinyl, piperazinyl, piperidinyl, pyrrolidinyl, tetrahydropyranyl, tetrahydrofuranyl, dihydrofuranyl, tetrahydrothienyl, dihydrothienyl, dihydroindolyl, tetrahydroquinolyl, tetrahydroisoquinolyl, pyranyl, pyrazolinyl, pyrazolidinyl, dihydropyranyl, tetrahydroquinolyl, imidazolinyl, imidazolidinyl, pyrrolinyl, oxazolidinyl, isoxazolidinyl, thiazolidinyl, isothiazolidinyl, dithiazolyl, and 1,3-dioxanyl. Heterocyclyl groups may be optionally substituted with one or more substituents.

By an "oxygen protecting group" is meant those groups intended to protect an oxygen containing (e.g., phenol, hydroxyl, or carbonyl) group against undesirable reactions during synthetic procedures. Commonly used oxygen protecting groups are disclosed in Greene, "Protective Groups in Organic Synthesis," 3rd Edition (John Wiley & Sons, New York, 1999), which is incorporated herein by reference. Exemplary oxygen protecting groups include acyl, aryloyl, or carbamyl groups, such as formyl, acetyl, propionyl, pivaloyl, t-butylacetyl, 2-chloroacetyl, 2-bromoacetyl, trifluoroacetyl, trichloroacetyl, phthalyl, o-nitrophenoxyacetyl, α-chlorobutyryl, benzoyl, 4-chlorobenzoyl, 4-bromobenzoyl, t-butyldimethylsilyl, tri-iso-propylsilyloxymethyl, 4,4'-dimethoxytrityl, isobutyryl, phenoxyacetyl, 4-isopropylpehenoxyacetyl, dimethylformamidino, and 4-nitrobenzoyl; alkylcarbonyl groups, such as acyl, acetyl, propionyl, and pivaloyl; optionally substituted arylcarbonyl groups, such as benzoyl; silyl groups, such as trimethylsilyl (TMS), tert-butyldimethylsilyl (TBDMS), tri-iso-propylsilyloxymethyl (TOM), and triisopropylsilyl (TIPS); ether-forming groups with the hydroxyl, such methyl, methoxymethyl, tetrahydropyranyl, benzyl, p-methoxybenzyl, and trityl; alkoxycarbonyls, such as methoxycarbonyl, ethoxycarbonyl, isopropoxycarbonyl, n-isopropoxycarbonyl, n-butyloxycarbonyl, isobutyloxycarbonyl, sec-butyloxycarbonyl, t-butyloxycarbonyl, 2-ethylhexyloxycarbonyl, cyclohexyloxycarbonyl, and methyloxycarbonyl; alkoxyalkoxycarbonyl groups, such as methoxymethoxycarbonyl, ethoxymethoxycarbonyl, 2-methoxyethoxycarbonyl, 2-ethoxyethoxycarbonyl, 2-butoxyethoxycarbonyl, 2-methoxyethoxymethoxycarbonyl, allyloxycarbonyl, propargyloxycarbonyl, 2-butenoxycarbonyl, and 3-methyl-2-butenoxycarbonyl; haloalkoxycarbonyls, such as 2-chloroethoxycarbonyl, 2-chloroethoxycarbonyl, and 2,2,2-trichloroethoxycarbonyl; optionally substituted arylalkoxycarbonyl groups, such as benzyloxycarbonyl, p-methylbenzyloxycarbonyl, p-methoxybenzyloxycarbonyl, p-nitrobenzyloxycarbonyl, 2,4-dinitrobenzyloxycarbonyl, 3,5-dimethylbenzyloxycarbonyl, p-chlorobenzyloxycarbonyl, p-bromobenzyloxy-carbonyl, and fluorenylmethyloxycarbonyl; and optionally substituted aryloxycarbonyl groups, such as phenoxycarbonyl, p-nitrophenoxycarbonyl, o-nitrophenoxycarbonyl, 2,4-dinitrophenoxycarbonyl, p-methyl-phenoxycarbonyl, m-methylphenoxycarbonyl, o-bromophenoxycarbonyl, 3,5-dimethylphenoxycarbonyl, p-chlorophenoxycarbonyl, and 2-chloro-4-nitrophenoxycarbonyl); substituted alkyl, aryl, and alkaryl ethers (e.g., trityl; methylthiomethyl; methoxymethyl; benzyloxymethyl; siloxymethyl; 2,2,2,-trichloroethoxymethyl; tetrahydropyranyl; tetrahydrofuranyl; ethoxyethyl; 1-[2-(trimethylsilyl)ethoxy]ethyl; 2-trimethylsilylethyl; t-butyl ether; p-chlorophenyl, p-methoxyphenyl, p-nitrophenyl, benzyl, p-methoxybenzyl, and nitrobenzyl); silyl ethers (e.g., trimethylsilyl; triethylsilyl; triisopropylsilyl; dimethylisopropylsilyl; t-butyldimethylsilyl; t-butyldiphenylsilyl; tribenzylsilyl; triphenylsilyl; and diphenymethylsilyl); carbonates (e.g., methyl, methoxymethyl, 9-fluorenylmethyl; ethyl; 2,2,2-trichloroethyl; 2-(trimethylsilyl)ethyl; vinyl, allyl, nitrophenyl; benzyl; methoxybenzyl; 3,4-dimethoxybenzyl; and nitrobenzyl); carbonyl-protecting groups (e.g., acetal and ketal groups, such as dimethyl acetal, and 1,3-dioxolane; acylal groups; and dithiane groups, such as 1,3-dithianes, and 1,3-dithiolane); carboxylic acid-protecting groups (e.g., ester groups, such as methyl ester, benzyl ester, t-butyl ester, and orthoesters; and oxazoline groups.

By a "nitrogen protecting group" is meant those groups intended to protect an amino group against undesirable reactions during synthetic procedures. Commonly used nitrogen protecting groups are disclosed in Greene, "Protective Groups in Organic Synthesis," 3$^{rd}$ Edition (John Wiley & Sons, New York, 1999), which is incorporated herein by reference. Nitrogen protecting groups include acyl, aryloyl, or carbamyl groups such as formyl, acetyl, propionyl, pivaloyl, t-butylacetyl, 2-chloroacetyl, 2-bromoacetyl, trifluoroacetyl, trichloroacetyl, phthalyl, o-nitrophenoxyacetyl, α-chlorobutyryl, benzoyl, 4-chlorobenzoyl, 4-bromobenzoyl, 4-nitrobenzoyl, and amino acids such as alanine, leucine, and phenylalanine; sulfonyl-containing groups such as benzenesulfonyl, and p-toluenesulfonyl; carbamate forming groups such as benzyloxycarbonyl, p-chlorobenzyloxycarbonyl, p-methoxybenzyloxycarbonyl, p-nitrobenzyloxycarbonyl, 2-nitrobenzyloxycarbonyl, p-bromobenzyloxycarbonyl, 3,4-dimethoxybenzyloxycarbonyl, 3,5-dimethoxybenzyloxycarbonyl, 2,4-dimethoxybenzyloxycarbonyl, 4-methoxybenzyloxycarbonyl, 2-nitro-4,5-dimethoxybenzyloxycarbonyl, 3,4,5-trimethoxybenzyloxycarbonyl, 1-(p-biphenylyl)-1-methylethoxycarbonyl, α,α-dimethyl-3,5-dimethoxybenzyloxycarbonyl, benzhydryloxy carbonyl, t-butyloxycarbonyl, diisopropylmethoxycarbonyl, isopropyloxycarbonyl, ethoxycarbonyl, methoxycarbonyl, allyloxycarbonyl, 2,2,2,-trichloroethoxycarbonyl, phenoxycarbonyl, 4-nitrophenoxy carbonyl, fluorenyl-9-methoxycarbonyl, cyclopentyloxycarbonyl, adamantyloxycarbonyl, cyclohexyloxycarbonyl, and phenylthiocarbonyl, alkaryl groups such as benzyl, triphenylmethyl, and benzyloxymethyl, and silyl groups, such as trimethylsilyl. Preferred nitrogen protecting groups are alloc, formyl, acetyl, benzoyl, pivaloyl, t-butylacetyl, alanyl, phenylsulfonyl, benzyl, t-butyloxycarbonyl (Boc), and benzyloxycarbonyl (Cbz).

As noted, substituents may be optionally substituted with halo, optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; —CN; —NO$_2$; —OR$_a$; —N(R$_a$)$_2$; —C(=O)R$_a$; —C(=O)OR$_a$; —S(=O)$_2$R$_a$; —S(=O)$_2$OR$_a$; —P(=O)R$_{a2}$; —O—P(=O)(OR$_a$)$_2$, or —P(=O)(OR$_a$)$_2$, or an ion thereof; wherein each R$_a$ is independently H, C$_{1-6}$ alkyl; optionally substituted C$_{3-10}$ carbocyclyl; optionally substituted C$_{1-9}$ heterocyclyl having one to four heteroatoms independently selected from O, N, and S; optionally substituted C$_{6-20}$ aryl; optionally substituted C$_{1-9}$ heteroaryl having one to four heteroatoms independently selected from O, N, and S; an oxygen protecting group; or a nitrogen protecting group. Cyclic substituents may also be substituted with C$_{1-6}$ alkyl. In specific embodiments of alloxazines, substituents may include optionally substituted with halo, optionally substituted C$_{3-10}$ carbocyclyl; optionally substituted C$_{1-9}$ heterocyclyl having one to four heteroatoms independently selected from O, N, and S; optionally substituted C$_{6-20}$ aryl; optionally substituted C$_{1-9}$ heteroaryl having one to four heteroatoms independently selected from O, N, and S; —NO$_2$; —OR$_a$; —N(R$_a$)$_2$; —C(=O)R$_a$; —C(=O)OR$_a$; —S(=O)$_2$R$_a$; —S(=O)$_2$OR$_a$; —P(=O) R$_{a2}$; —O—P(=O)(OR$_a$)$_2$, or —P(=O)(OR$_a$)$_2$, or an ion thereof; wherein each R$_a$ is independently H, C$_{1-6}$ alkyl; optionally substituted C$_{3-10}$ carbocyclyl; optionally substituted C$_{1-9}$ heterocyclyl having one to four heteroatoms independently selected from O, N, and S; optionally substituted C$_{6-20}$ aryl; optionally substituted C$_{1-9}$ heteroaryl having one to four heteroatoms independently selected from O, N, and S; an oxygen protecting group; or a nitrogen protecting group, and cyclic substituents may also be substituted with C$_{1-6}$ alkyl. In specific embodiments of quinones, alkyl groups may be optionally substituted with one, two, three, or, in the case of alkyl groups of two carbons or more, four substituents independently selected from the group consisting of halo, hydroxyl, C$_{1-6}$ alkoxy, SO$_3$H, amino, nitro, carboxyl, phosphoryl, phosphonyl, thiol, C$_{1-6}$ alkyl ester, optionally substituted C$_{1-6}$ alkyl thio, and oxo, or an ion thereof.

Exemplary ions of substituent groups are as follows: an exemplary ion of hydroxyl is —O$^-$; an exemplary ion of —COOH is —COO$^-$; exemplary ions of —PO$_3$H$_2$ are —PO$_3$H$^-$ and —PO$_3^{2-}$; an exemplary ion of —PO$_3$HR$_a$ is —PO$_3$R$_a^-$, where R$_a$ is not H; exemplary ions of —PO$_4$H$_2$ are —PO$_4$H$^-$ and —PO$_4^{2-}$; and an exemplary ion of —SO$_3$H is —SO$_3^-$.

DETAILED DESCRIPTION OF THE INVENTION

Figure 1:
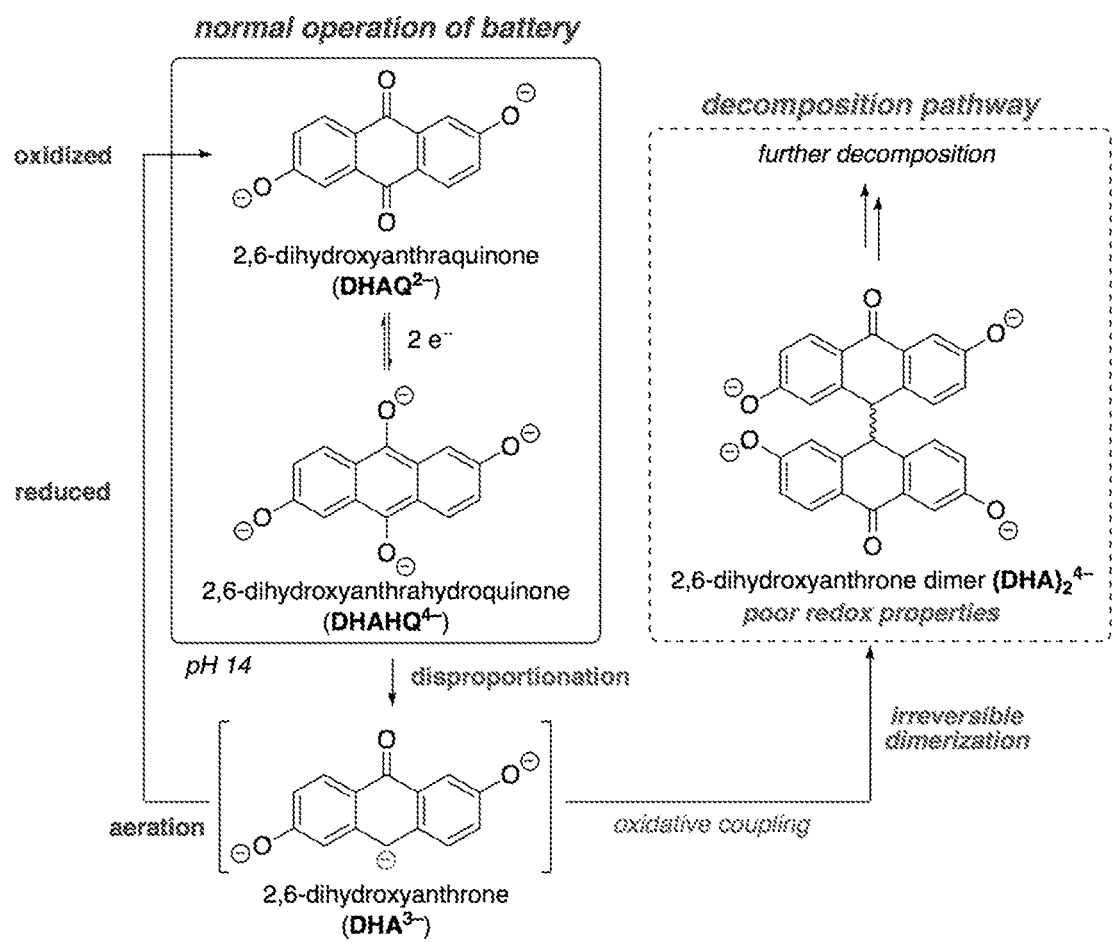
FIG. 1. Scheme of the intended operation and decomposition pathway of a DHAQ/Fe(CN)$_6$ flow battery. DHA is depicted in its presumed protonation state at pH 14 as DHA$^{3-}$.

Redox flow batteries based on quinone-bearing aqueous electrolytes have emerged as promising systems for energy storage from intermittent renewable sources. The lifetime of these batteries is limited by quinone stability. Here we identify irreversible dimerization as the mechanism of capacity loss in a RFB utilizing the inexpensive redox couples of 2,6-dihydroxyanthraquinone (DHAQ) and potassium salts of iron hexacyanide (Fe(CN)$_6$) as a model system. Under ideal conditions, discharging a flow battery involves the reversible oxidation and concurrent reduction of the low potential (negolyte) and high potential (posolyte) active species respectively. In a DHAQ/Fe(CN)$_6$ flow battery, the reactions and potentials vs SHE are

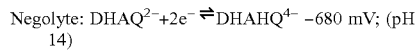
Negolyte: DHAQ$^{2−}$+2e$^−$ ⇌ DHAHQ$^{4−}$ −680 mV; (pH 14)

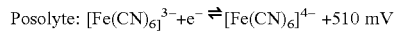
Posolyte: [Fe(CN)$_6$]$^{3−}$+e$^−$ ⇌ [Fe(CN)$_6$]$^{4−}$ +510 mV

In practice, decomposition of the negolyte active species causes the battery capacity to fade at ~5-8%/day. As this rate limits the lifetime to the order of 1 week, identifying and inhibiting the mechanism of capacity loss is critical for the battery to approach the decadal service life that will be necessary for large-scale grid storage applications. We further demonstrate that capacity loss can be suppressed through simple modifications of the battery operating conditions. In particular, capacity loss can be reduced by reducing the state of charge of the anthraquinone and/or providing an oxidizing agent after discharge.

Flow Batteries

Flow batteries of the invention include a negolyte that includes the anthraquinone dissolved or suspended in aqueous solution; a poslyte that includes a redox active species; and a barrier separating the two.

In some embodiments, the anthraquinone is of formula (I):

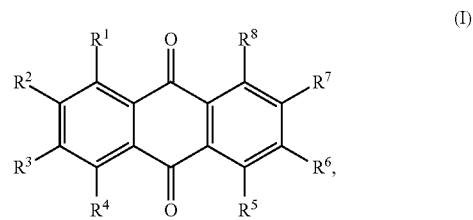

wherein each of R$^1$, R$^2$, R$^3$, R$^4$, R$^5$, R$^6$, R$^7$ and R$^8$ is independently selected from H; halo; optionally substituted C$_{1-6}$ alkyl; oxo; optionally substituted C$_{3-10}$ carbocyclyl; optionally substituted C$_{1-9}$ heterocyclyl having one to four heteroatoms independently selected from O, N, and S; optionally substituted C$_{6-20}$ aryl; optionally substituted C$_{1-9}$ heteroaryl having one to four heteroatoms independently selected from O, N, and S; —CN; —NO$_2$; —OR$_a$ (e.g., hydroxyl or C$_{1-6}$ alkoxy); —SR$_a$ (e.g., thiol or C$_{1-6}$ alkyl thio); —N(R$_a$)$_2$ (e.g., amino); —C(=O)R$_a$; —C(=O)OR$_a$ (e.g., carboxyl); —S(=O)$_2$R$_a$; —S(=O)$_2$OR$_a$ (e.g., SO$_3$H); —P(=O)R$_{a2}$; and —P(=O)(OR$_a$)$_2$ (e.g., phosphonyl or phosphoryl); or any two adjacent groups selected from R$^1$, R$^2$, R$^3$, and R$^4$ are joined to form an optionally substituted 3-6 membered ring, or an ion thereof, wherein each R$_a$ is independently H; C$_{1-6}$ alkyl; optionally substituted C$_{3-10}$ carbocyclyl; optionally substituted C$_{1-9}$ heterocyclyl having one to four heteroatoms independently selected from O, N, and S; optionally substituted C$_{6-20}$ aryl; optionally substituted C$_{1-9}$ heteroaryl having one to four heteroatoms independently selected from O, N, and S; an oxygen protecting group; or a nitrogen protecting group. The anthraquinone of the invention is a source of electrons during discharge and not merely a charge transfer agent. In embodiments, the anthraquinone is water soluble.

In certain embodiments, each of R$^1$, R$^2$, R$^3$, R$^4$, R$^5$, R$^6$, R$^7$ and R$^8$ is independently selected from H, optionally substituted C$_{1-6}$ alkyl, halo, hydroxyl, optionally substituted C$_{1-6}$ alkoxy, SO$_3$H, amino, nitro, carboxyl, phosphoryl, phosphonyl, and oxo, or an ion thereof. In particular embodiments, each of R$^1$, R$^2$, R$^3$, R$^4$, R$^5$, R$^6$, R$^7$, and R$^8$ is independently selected from H, hydroxyl, optionally substituted C$_{1-4}$ alkyl, carboxyl, and SO$_3$H, such as each of R$^1$, R$^2$, R$^3$, R$^4$, R$^5$, R$^6$, R$^7$ and R$^8$ being independently selected from H, hydroxyl, optionally substituted C$_{1-4}$ alkyl (e.g. methyl), and oxo. In embodiments, at least one, e.g., at least two, of R$^1$, R$^2$, R$^3$, R$^4$, R$^5$, R$^6$, R$^7$, and R$^8$ is not H.

In other embodiments, the anthraquinone, such as a 9,10-anthraquinone, is substituted with at least one hydroxyl group and optionally further substituted with a C$_{1-4}$ alkyl, such as methyl. Exemplary quinones include 2,6-dihydroxy- 9,10-anthraquinone (2,6-DHAQ), 1,5-dimethyl-2,6-dihydroxy-9,10-anthraquinone, 2,3,6,7-tetrahydroxy-9,10-anthraquinone, 1,3,5,7-tetrahydroxy-2,4,6,8-tetramethyl-9,10-anthraquinone, and 2,7-dihydroxy-1,8-dimethyl-9,10-anthraquinone. Ions and reduced species thereof are also contemplated.

Examples of redox active species for the posolyte include bromine, chlorine, iodine, oxygen, vanadium, chromium, cobalt, iron (e.g., ferricyanide/ferrocyanide or a ferrocene derivative, e.g., as described in WO 2018/032003), aluminum, e.g., aluminum(III) biscitrate monocatecholate, manganese, cobalt, nickel, copper, or lead, e.g., a manganese oxide, a cobalt oxide, or a lead oxide. A benzoquinone may also be used as the redox active species. Other redox active species suitable for use in batteries of the invention are described in WO 2014/052682, WO 2015/048550, and WO 2016/144909, the redox active species of which are incorporated by reference. The redox active species may be dissolved or suspended in solution (such as aqueous solution), be in the solid state, or be gaseous, e.g., molecular oxygen in air.

In some embodiments, the electrolytes are both aqueous, where the anthraquinone and redox active species are in aqueous solution or aqueous suspension. In addition, the electrolyte may include other solutes, e.g., acids (e.g., HCl) or bases (e.g., LiOH, $NH_4OH$, NaOH, or KOH) or alcohols (e.g., methyl, ethyl, or propyl) and other co-solvents to increase the solubility of a particular quinone/hydroquinone. Counter ions, such as cations, e.g., $NH_4^+$, $Li^+$, $Na^+$, $K^+$, or a mixture thereof, may also be present. In certain embodiments, the pH of the electrolyte may be >7, e.g., at least 8, 9, 10, 11, 12, 13, or 14, 8-14, 9-14, 10-14, 11-14, 12-14, 13-14, or about 14. The electrolyte may or may not be buffered to maintain a specified pH. The anthraquinone and redox actives species will be present in amounts suitable to operate the battery, for example, from 0.1-15 M, or from 0.1-10 M. In some embodiments, the solution is at least 10%, 20%, 30%, 40%, 50%, 60%, 70%, or 80% water, by mass. Quinones, hydroquinones, salts, and/or ions thereof may be present in a mixture.

Electrodes for use with an anthraquinone include any carbon electrode, e.g., glassy carbon electrodes, carbon paper electrodes, carbon felt electrodes, or carbon nanotube electrodes. Titanium electrodes may also be employed. Electrodes can also be made of a high specific surface area conducting material, such as a nanoporous metal sponge (T. Wada, A. D. Setyawan, K. Yubuta, and H. Kato, *Scripta Materialia* 65, 532 (2011)), which has been synthesized previously by electrochemical dealloying (J. D. Erlebacher, M. J. Aziz, A. Karma, N. Dmitrov, and K. Sieradzki, *Nature* 410, 450 (2001)), or a conducting metal oxide, which has been synthesized by wet chemical methods (B. T. Huskinson, J. S. Rugolo, S. K. Mondal, and M. J. Aziz, arXiv: 1206.2883 [cond-mat.mtrl-sci]; *Energy & Environmental Science* 5, 8690 (2012); S. K. Mondal, J. S. Rugolo, and M. J. Aziz, *Mater. Res. Soc. Symp. Proc.* 1311, GG10.9 (2010)). Chemical vapor deposition can be used for conformal coatings of complex 3D electrode geometries by ultra-thin electrocatalyst or protective films. Electrodes suitable for other redox active species are known in the art.

The barrier allows the passage of ions, such as sodium or potassium, but not a significant amount of the anthraquinone, anthrahydroquinone, or other redox active species. Examples of ion conducting barriers are NAFION®, i.e., sulfonated tetrafluoroethylene based fluoropolymer-copolymer, FUMASEP®, i.e., non-fluorinated, sulfonated polyaryletherketone-copolymer, e.g., FUMASEP® E-620(K), hydrocarbons, e.g., polyethylene, and size exclusion barriers, e.g., ultrafiltration or dialysis membranes with a molecular weight cut off of 100, 250, 500, or 1,000 Da. For size exclusion membranes, the required molecular weight cut off is determined based on the molecular weight of the anthraquinone or other redox active species employed. Porous physical barriers may also be included, when the passage of redox active species is tolerable.

The battery may also include a controller that controls the charging of the anthraquinone. For example, the controller may charge the anthraquinone to less than 100%, e.g., less than 99, 98, 97, 96, 95, 90, 85, 80, 75, 70, 65, 60, 55, 50, or 45%. The controller may also provide a minimum state of charge, e.g., of at least 45%, such as at least 50, 55, 60, 65, 70, 75, 80, or 85%. For example, the state of charge may be maintained between 45-95%, such as 45-55%, 45-65%, 45-75%, 45-85%, 50-95%, 50-90%, 50-85%, 50-80%, 50-70%, 50-60%, 60-95%, 60-90%, 60-85%, 60-80%, 60-70%, 70-95%, 70-90%, 70-80%, 80-95%, 80-90%, 80-85%, 85-95%, 85-90%, or 90-95%. The controller may limit the state of charge by imposing a Coulomb constraint on the charging step.

The battery may also include a source of oxidizing agent in fluid communication with the negolyte and/or a gas dispersion element in the negolyte. Examples of oxidizing agents in molecular oxygen. In embodiments, the source of the oxidizing agent may be a container, e.g., for a liquid, solid, or gas, that is in fluid communication with the negolyte, i.e., connected to allow delivery of the agent to the negolyte. Containers include gas tanks, liquid reservoirs, and containers for solids. The negolyte may also include elements to disperse or mix the oxidizing agent including mixers, agitators, shakers, or gas dispersion elements (e.g., fritted glass elements). In embodiments, the oxidizing agent is molecular oxygen in ambient air, which can be delivered to the negolyte by a gas dispersion element. Gasses, including ambient air, compressed air, or oxygen, may be filtered, dried, or otherwise processed prior to delivery to the negolyte.

A battery of the invention may include additional components as is known in the art. Anthraquinones and other redox active species in aqueous solution or aqueous suspension are housed in a suitable reservoir. A battery may further include one or more pumps to pump aqueous solutions or suspensions past one or both electrodes. Alternatively, the electrodes may be placed in a reservoir that is stirred or in which the solution or suspension is recirculated by any other method, e.g., convection, sonication, etc. Batteries may also include graphite flow plates and corrosion-resistant metal current collectors.

The balance of the system around the cell includes fluid handling and storage, and voltage and round-trip energy efficiency measurements can be made. Systems configured for measurement of negolyte and posolyte flows and pH, pressure, temperature, current density and cell voltage may be included and used to evaluate cells. Fluid sample ports can be provided to permit sampling of both electrolytes, which will allow for the evaluation of parasitic losses due to reactant crossover or side reactions. Electrolytes can be sampled and analyzed with standard techniques.

Suitable cells, electrodes, membranes, and pumps for redox flow batteries are known in the art, e.g., WO 2014/052682, WO 2015/048550, and WO 2016/144909, the battery components of which are hereby incorporated by reference.

Methods

As described, the invention provides methods for reducing the loss of capacity in a flow battery including an anthraquinone. The reduction may occur by limiting the state of charge of the anthraquinone and/or by oxidizing the negolyte after discharge. In controlling the state of charge, the method may limit the state of charge to 99, 98, 97, 96 or 95% or less, e.g., less than 90, 85, 80, 75, 70, 65, 60, 55, 50, or 45%. In embodiments, the state of charge is at least 60%, e.g., at least 65, 70, 75, 80, 85, or 90%. For example, the state of charge may be maintained between 45-95%, such as 45-55%, 45-65%, 45-75%, 45-85%, 50-95%, 50-90%, 50-85%, 50-80%, 50-70%, 50-60%, 60-95%, 60-90%, 60-85%, 60-80%, 60-70%, 70-95%, 70-90%, 70-80%, 80-95%, 80-90%, 80-85%, 85-95%, 85-90%, or 90-95%. Alternatively or in addition, the loss of capacity may be reduced by adding an oxidizing agent, e.g., molecular oxygen, to the negolyte after discharge. The oxidizing agent may be added after each discharge cycle or after a plurality of cycles, e.g., at least 10, 100, 500, or 1000. Gaseous oxidizing agents may be added passively or via a gas dispersion element that "bubble" gas into the negolyte. Passive addition relies on dissolution of ambient gas into the liquid, e.g., with stirring or shaking. Liquid and solid oxidizing agents may be added to the negolyte and mixed by stirring, shaking, or other agitation. The amount of oxidation agent can be determined by one of skill in the art to be sufficient to oxidize anthrone in the negolyte, e.g., at 50% of the anthrone produce, such as at least 60, 70, 80, 90, 95, or 99% of anthrone present).

The methods of the invention may be employed to reduce loss of capacity as a function of time (independent of the number of cycles). In embodiments, the methods reduce the loss of capacity to a rate of less than 5% per day, e.g., less than 4, 3, 2, 1, 0.5, 0.1, 0.05, or 0.001. For example, the loss of capacity may be between 0.0001-5% per day, e.g., 0.0001-1%, 0.0001-0.1%, 0.0001-0.05%, 0.001-1%, 0.001-0.1%, 0.001-0.05%, 0.01-1%, 0.01-0.5%, or 0.01-0.1%. The methods may be practiced for a period of at least one week, one month, six months, or one year. The method may be applied to any organic or organometallic redox active species, such as an anthraquinone as described herein.

EXAMPLES

The invention will be further described by the following non-limiting example.

Figure 6:
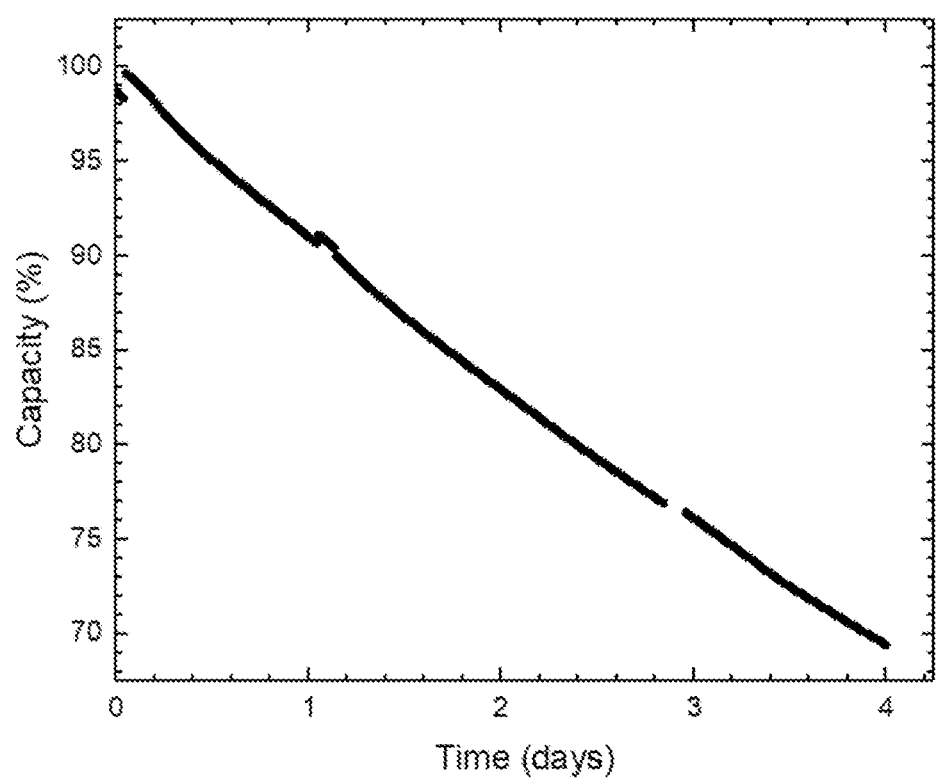
FIG. 6. Unbalanced compositionally-symmetric cell cycling of 0.1 M DHAQ in a 1.2 M KOH solution, demonstrating loss of capacity over time.

To identify the chemical origin of negolyte active species degradation, we cycled a sample of DHAQ electrolyte repeatedly over the course of several days in a symmetric cell and analyzed its composition (FIG. 6). In addition to deprotonated forms of DHAQ and its intended reduction product, dihydroxyanthrahydroquinone (DHAHQ), we identified the decomposition products 2,6-dihydroxyanthrone (DHA) and its dimers ((DHA)$_2$) (FIG. 1).

The identification of DHA was enabled by precisely controlling cycling conditions that began with a strong discharging (oxidation) overpotential of +350 mV, initially accessing >99% of the theoretical DHAQ capacity. Near day 0.5 of cycling, the oxidation overpotential was lowered to +200 mV, leading to a sudden drop in capacity. Cycling was continued with this oxidative overpotential for several days, and aliquots were taken periodically in the discharged state for $^1$H NMR spectroscopy. The presence and increasing intensity of new peaks in the NMR spectrum indicates the accumulation of another chemical species besides DHAQ. The structure of DHA was suggested by high resolution mass spectrometry and confirmed by an exact match to the $^1$H NMR spectrum and HPLC retention time of an authentic sample. When samples containing DHA were subjected to electrochemical oxidation (FIG. 7A), mass spectrometric peaks corresponding to (DHA)$_2$ were observed. The assignment of (DHA)$_2$ was confirmed by the isolation of pure samples by preparative HPLC and subsequent NMR analysis.

Figure 8:
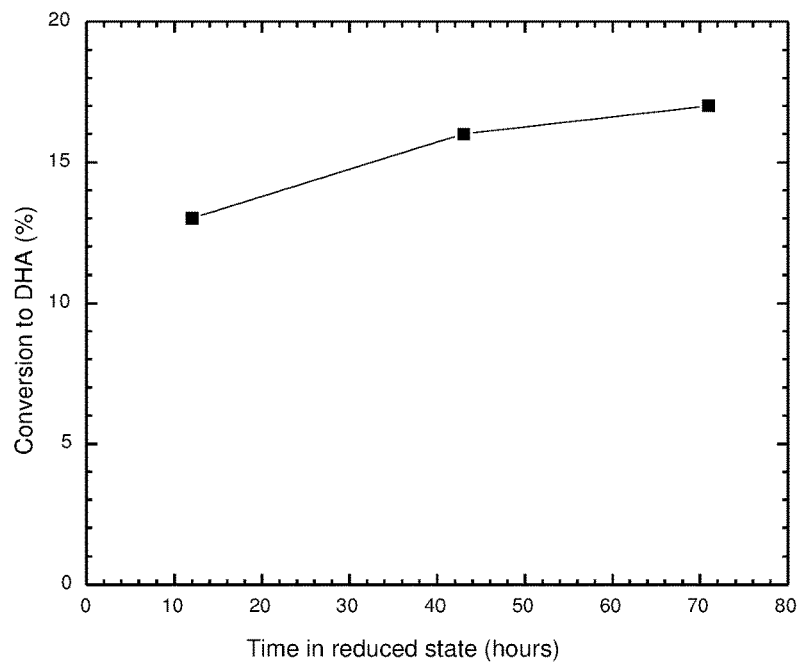
FIG. 8. Amount of DHA formed during cycling pause while DHAQ electrolyte was held in reservoir in reduced state of charge.

Two observations suggest that DHAHQ in alkaline solution undergoes disproportionation. First, increasing the reduction overpotential beyond the potential required to reduce DHAQ to DHAHQ does not increase the rate of capacity loss. Additionally, increasing proportions of DHA are formed when DHAHQ is held away from the electrodes in a sealed vial for increasing durations (FIG. 8). This disproportionation would occur according to the following proposed reaction:

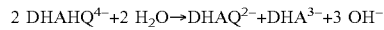

2 DHAHQ$^{4-}$+2 H$_2$O→DHAQ$^{2-}$+DHA$^{3-}$+3 OH$^-$

Figure 2A:
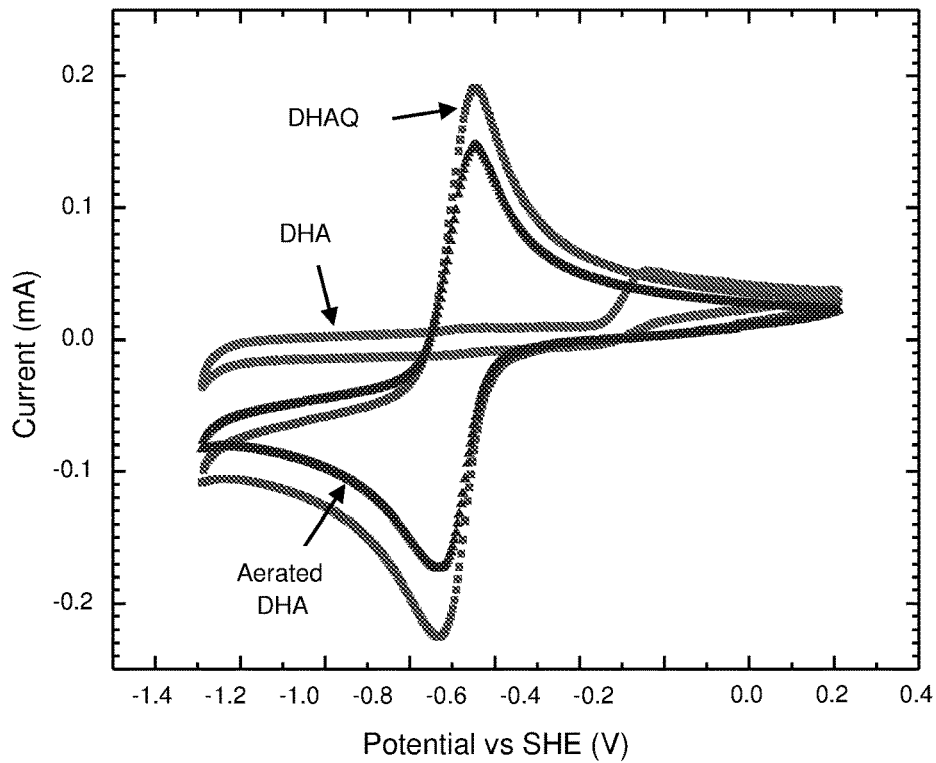
FIGS. 2A-2B. A. Cyclic voltammetry of 10 mM synthesized DHA at pH 14 under a nitrogen atmosphere. After aeration, redox activity is recovered through conversion of DHA to DHAQ. A separate 10 mM DHAQ sample is shown for comparison. B. (DHA)$_2$ has a higher redox potential than DHAQ, which leads to poor battery performance. Cyclic voltammograms were obtained separately for DHAQ and (DHA)$_2$, both at 5 mM in 1 M KOH. The (DHA)$_2$ sample contained a ~5% DHAQ impurity.
Figure 9:
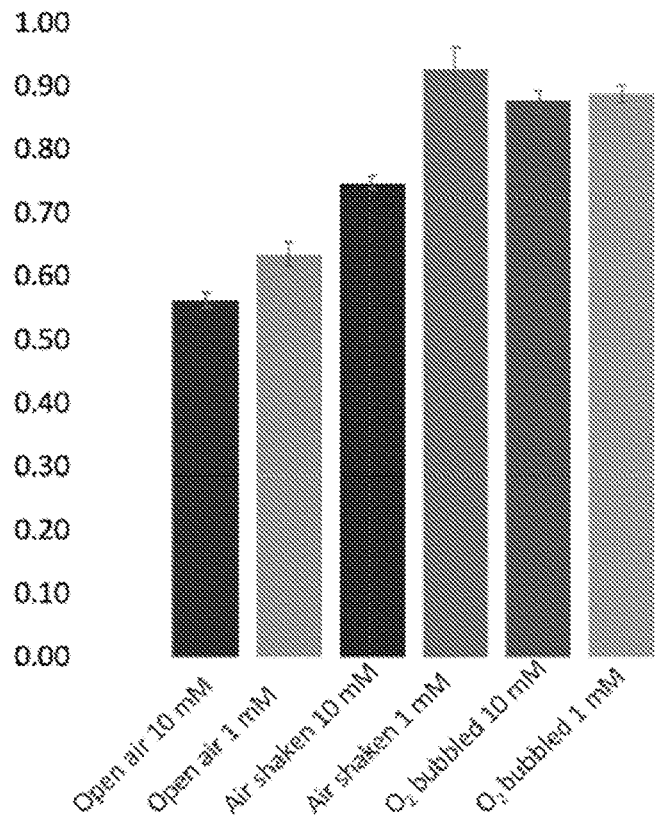
FIG. 9. Dependence of fraction of DHAQ formed relative to initial DHA on initial DHA concentration and method of oxygen exposure. The data demonstrate that the fraction of DHAQ recovered varies based on the initial DHA concentration and method of oxygenation and that with sufficient oxygen exposure, greater than 90% recovery may be achieved.
Figure 10A:
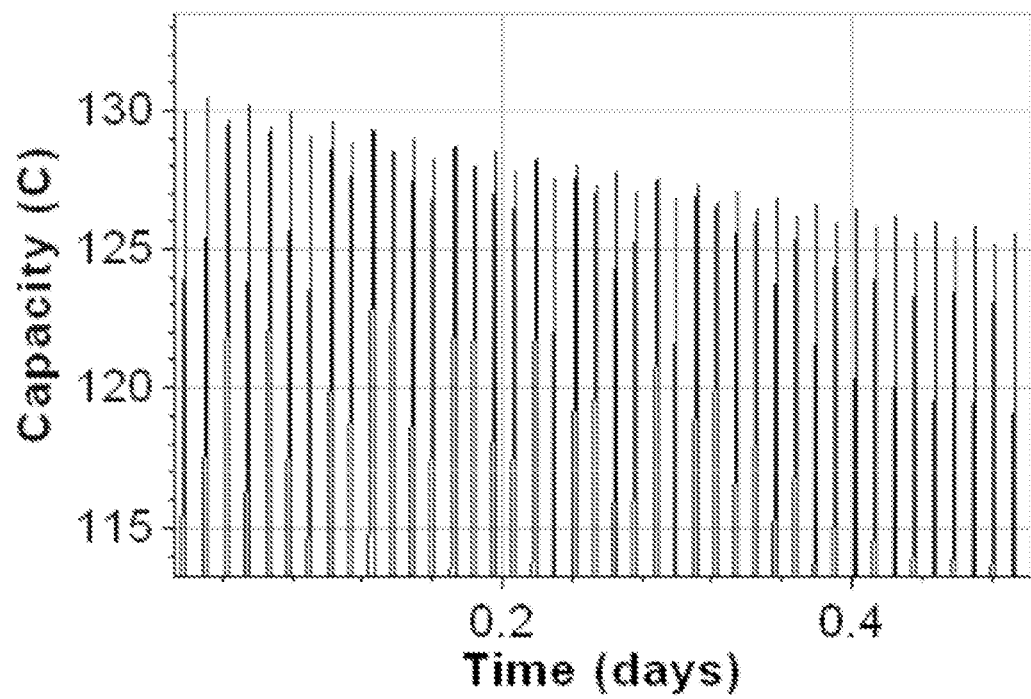
FIGS. 10A-10C. A. Symmetric cell cycling of 6 mL of 0.1 M DHAQ in a 1.2 M KOH solution, showing a capacity fade rate of ~8.0%/day. B. Symmetric cell cycling of 6.5 mL of 0.01 M DHAQ in a 1.02 M KOH solution, showing a capacity fade rate of ~4.2%/day. C. Symmetric cell cycling of 8 mL of 0.001 M DHAQ in a 1 M KOH solution, showing a capacity fade rate of ~1.9%/day.
Figure 10B:
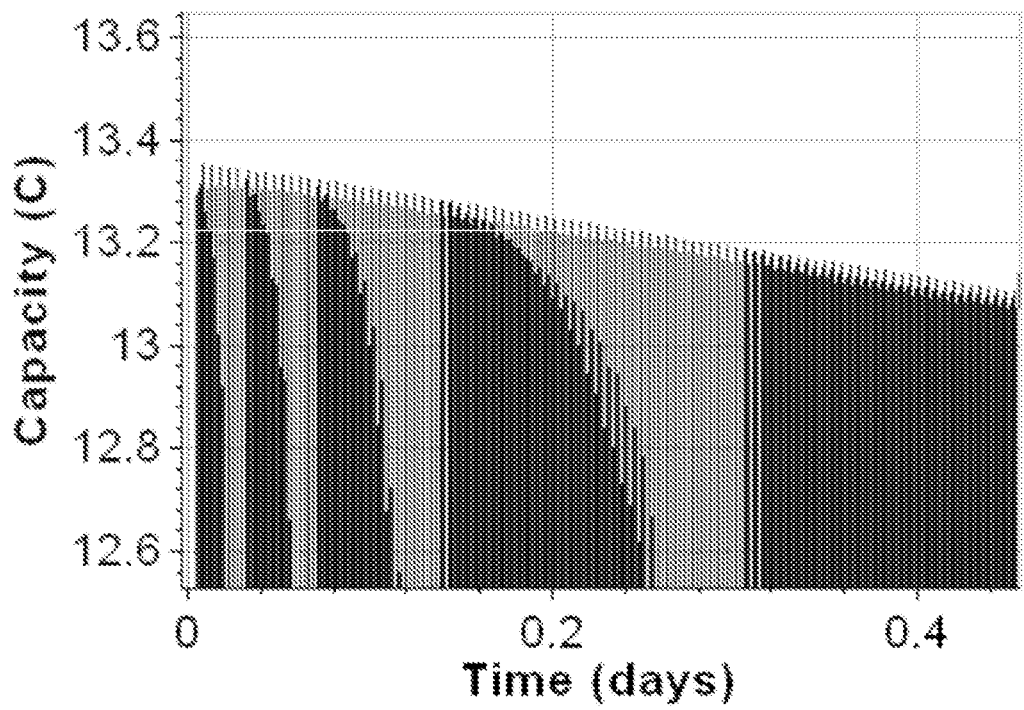
Figure 10C:
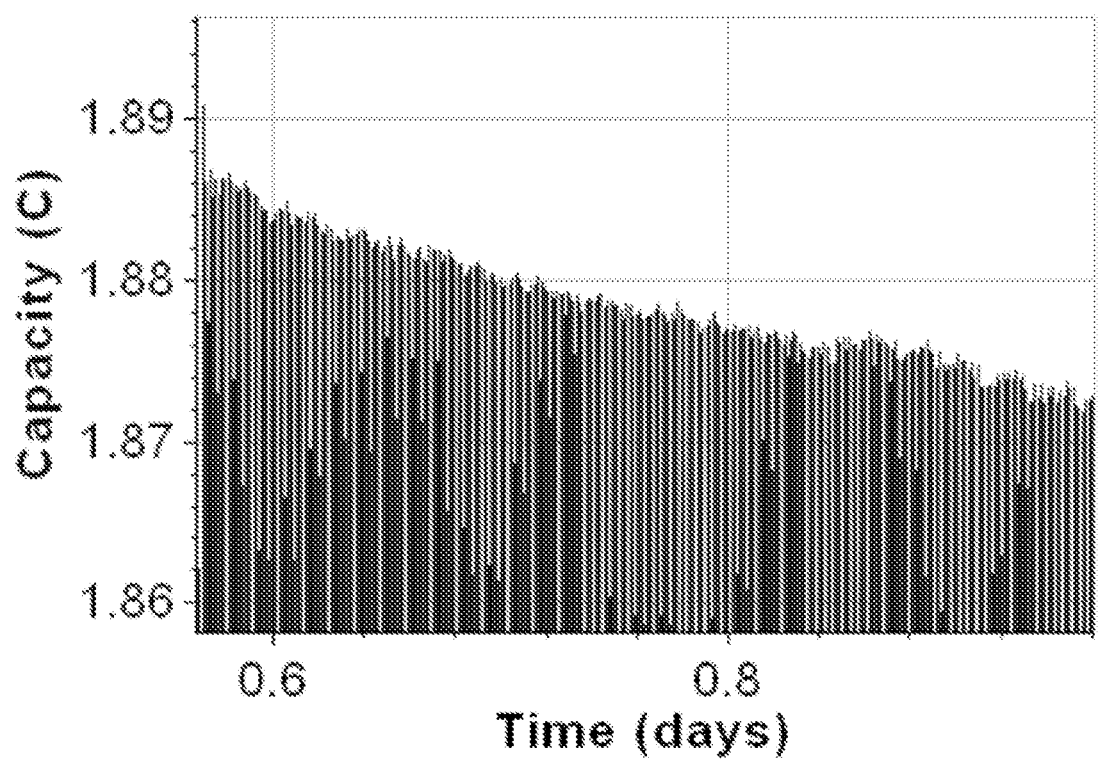

Under the highly alkaline conditions within the negolyte compartment, facile one-electron oxidation of the DHA carbanion, followed by radical dimerization, would lead to (DHA)$_2$. Indeed, pure samples of DHA are completely and irreversibly converted to (DHA)$_2$ when subjected to electrochemical oxidation under alkaline and anaerobic conditions. However, under aerobic conditions, oxidation of DHA back to DHAQ can be favored over dimerization (FIGS. 2A and 9), particularly at low DHA concentration (FIGS. 10A-10C).

Figure 2B:
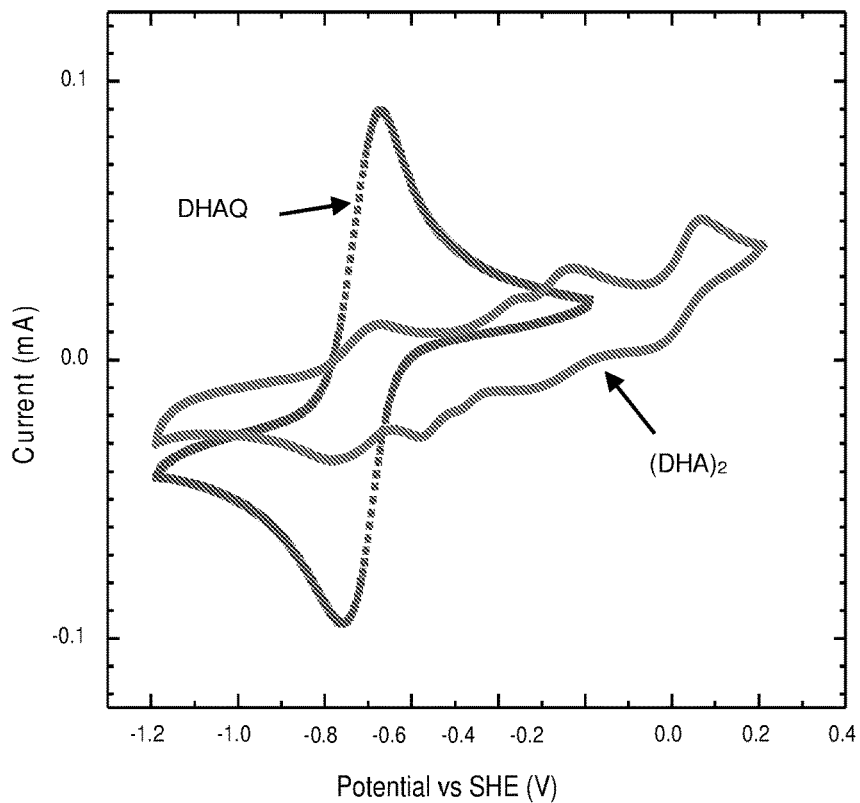
Figure 11A:
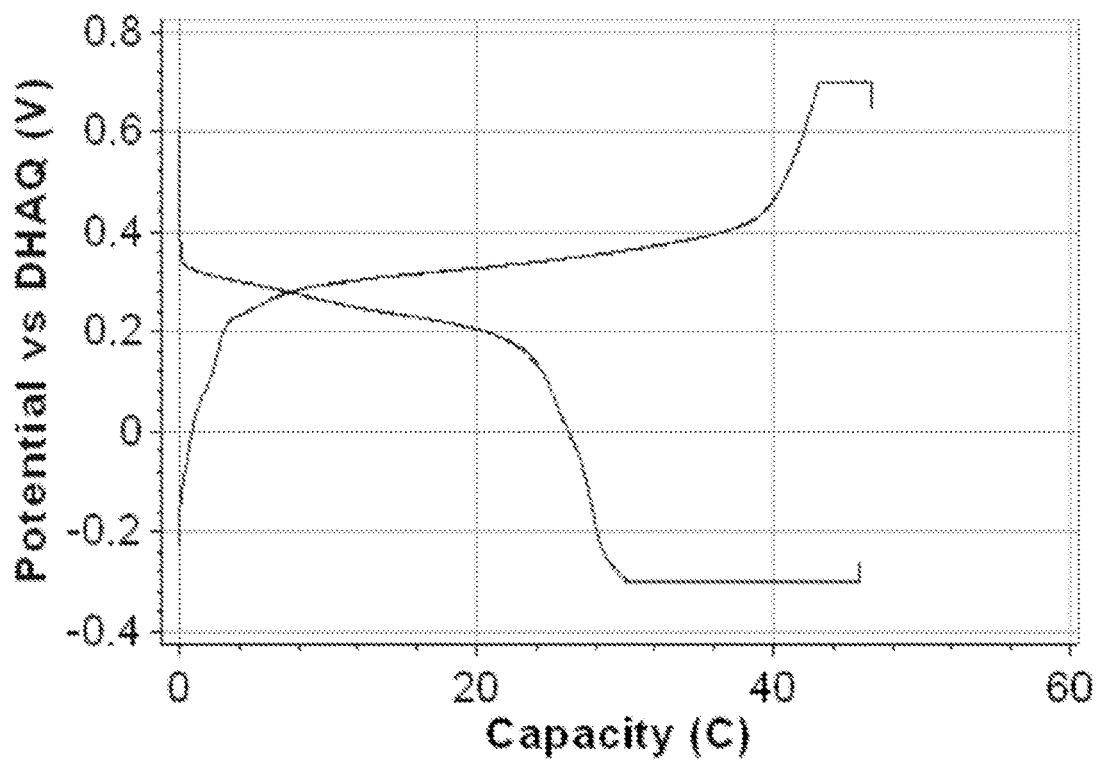
FIGS. 11A-11B. A. A typical cycle from the cycling of 5 mL of 0.05 M (DHA)$_2$ in a 1.2 M KOH solution vs 0.1 M DHAQ in a 1.2 M KOH solution from −300 mV to +700 mV with 3 mA cm$^{-2}$ current cutoff limits. B. Change in capacity vs. time.

The irreversible conversion of DHAHQ to (DHA)$_2$ has a deleterious effect on battery operation due to the replacement of the anthraquinone moiety with a benzophenone functional group (FIGS. 2B and 11A). Although (DHA)$_2$ is also redox-active, its use in a RFB is impractical for several reasons. First, the higher reduction potential of (DHA)$_2$ with respect to DHAQ (FIG. 2B) decreases the overall potential of the battery prohibitively. Second, even with strong overpotentials, cycling accesses only two electrons per molecule (FIG. 11 B). Thus, at twice the molecular weight of DHAQ, (DHA)$_2$ has half the capacity by mass. Finally, (DHA)$_2$ is unstable at pH 14. These findings indicate that the conversion of DHAQ to (DHA)$_2$ engenders a progressive loss of battery capacity.

To establish that irreversible dimerization is the primary mechanism of capacity loss, we quantitatively correlated the decrease in concentrations of DHAQ and DHAHQ with the extent of capacity loss. We subjected a typical flow battery containing 0.1 M DHAQ/DHAHQ to symmetric cell-cycling at pH 14 (8 cycles over ~5 h). When cycling was stopped and the capacity-limiting side held in a reduced state for 43 h, the battery capacity decreased by 15% (FIG. 3) when corrected for aliquot volume removal. When cycling with ±350 mV discharge overpotential was resumed, the first oxidative discharge half-cycle included the transient capacity associated with the irreversible conversion of DHA to (DHA)$_2$. $^1$H NMR analysis of an aliquot of negolyte removed after aging revealed that the total concentration of DHAQ had declined by 16%. This decrease was mass-balanced by an increase in DHA concentration of 16% (as determined by NMR analysis). Both quantities correspond well to the observed loss in capacity of 15%. In addition, all of the DHA formed was measurably converted to (DHA)$_2$ (FIGS. 12A-14). These observations strongly implicate anthrone formation and subsequent dimerization as the primary source of capacity loss. Anthrone and dianthrone species have also been reported to be products of the chemical reduction of anthraquinones and of the electrochemical reduction of anthraquinones in acidic aqueous solutions.

The finding that irreversible dimerization is linked to the redox chemistry of anthraquinones may limit the ongoing search for quinones with lower potentials. This is because any decrease in the reduction potential of the quinone/hydroquinone couple may simultaneously increase the propensity for the hydroquinone to disproportionate into anthrone and quinone. This hypothesis is supported both by calculations (FIG. 4; PM7/COSMO on a subset of molecules from Tabor et al. ChemRxiv 2018, DOI: 10.26434/chemrxiv.6990053.v2) and the experimental properties of 4,4'-((9,10-anthraquinone-2,6-diyl)dioxy)dibutyrate (2,6-DBEAQ) (Kwabi et al. Joule 2018, 2, 1907). This negolyte active species has a reduction potential that is 180 mV higher than that of DHAQ and is approximately 100 times more stable in terms of RFB lifetime (Kwabi et al. Joule 2018, 2, 1907). In addition to the associated decrease in battery voltage that this higher reduction potential entails, 2,6-DBEAQ is synthesized from DHAQ, increasing its cost (Kwabi et al. Joule 2018, 2, 1907). Strategies that can increase the lifetime of anthraquinones independently of their redox potential would therefore be valuable.

Figure 5A:
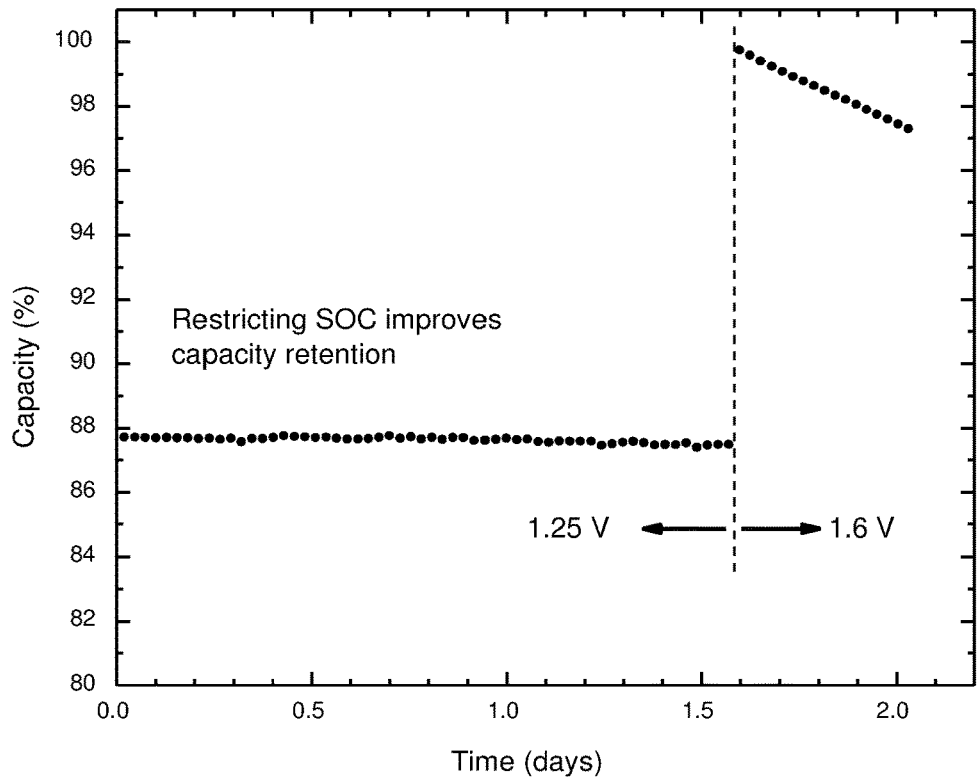
FIGS. 5A-5B. A. Limiting the state of charge reduces the rate of capacity loss in a negolyte-limited DHAQ/Fe(CN)$_6$ full cell. Over the first 1.6 days, the operating state of charge was limited to 88% of the theoretical capacity (i.e., 88% DHAHQ and 12% DHAQ), and the capacity faded at only 0.14%/day. The right-hand segment reflects typical operating conditions (cycling to 99.9% of theoretical capacity), and the capacity faded at 5.6%/day. B Symmetric cell cycling in which the capacity-limiting side (5 mL of 0.1 M DHAQ in 1.2 M KOH) demonstrates recovery of 70% of lost capacity after aeration of discharged electrolyte.
Figure 16A:
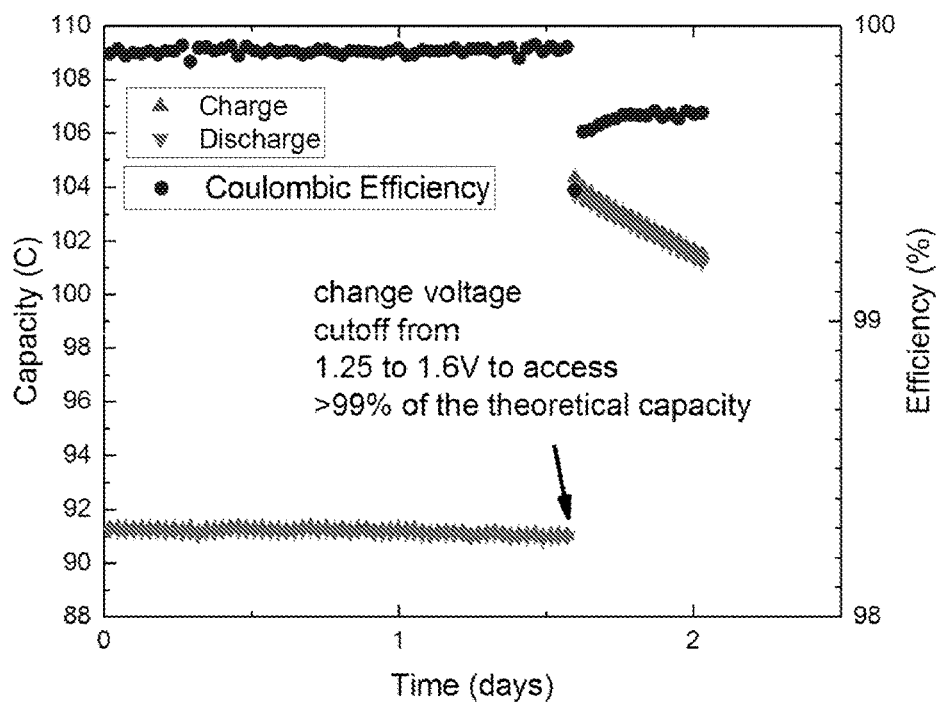
FIGS. 16A-16B. A. Limiting the state of charge reduces the rate of capacity loss in a negolyte-limited DHAQ-Fe(CN)$_6$ full cell. Over the first 1.6 days, the operating state of charge was limited to 88% of the theoretical capacity (i.e., 88% DHAHQ and 12% DHAQ), and the capacity faded at only 0.14%/day. The right-hand segment reflects typical operating conditions (cycling to 99.9% of theoretical capacity), and the capacity faded at 5.6%/day. B. Symmetric cell cycling in which the capacity-limiting side (5 mL of 0.1 M DHAQ in a 1.2 M KOH solution) demonstrates recovery of 70% of lost capacity after aeration of discharged electrolyte.
Figure 17:
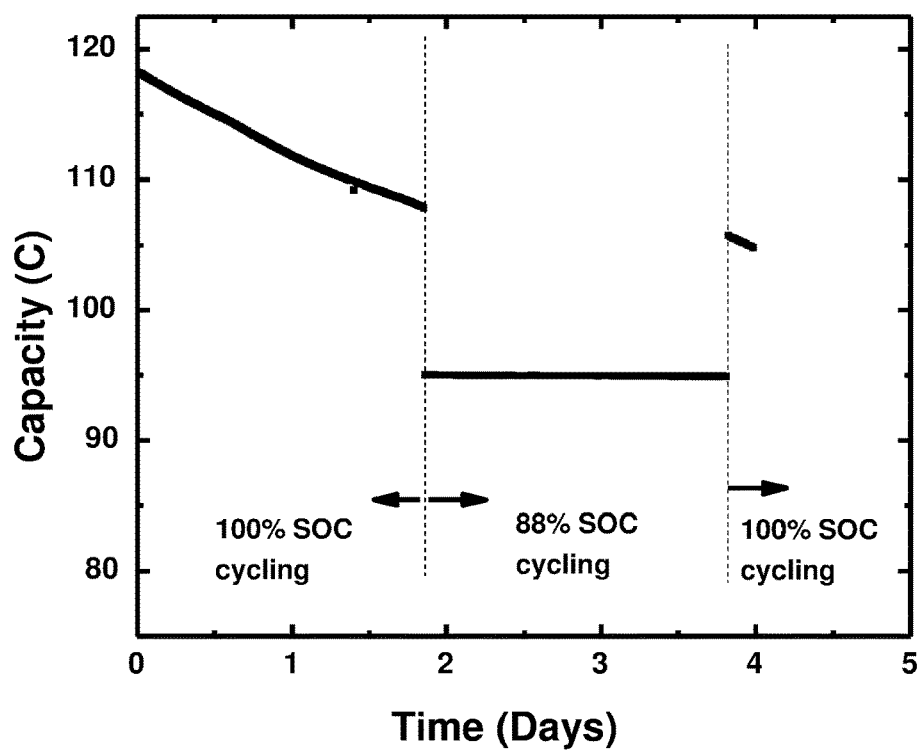
FIG. 17. Potentiostatic full cell cycling of 0.1 M DHAQ in a 1.2 M KOH solution vs 0.05 M K$_4$[Fe(CN)$_6$] in a nitrogen atmosphere.

Two simple changes to the operating conditions of the battery may be used to greatly decrease the rate of capacity loss. Because the degradation pathway is initiated by disproportionation of DHAHQ, we hypothesized that avoiding high states of charge would decrease the amount of DHA formed (FIG. 15), thereby extending battery life. When a DHAQ/Fe(CN)$_6$ flow battery was cycled at 100 mA/cm$^2$ with a 1.25 V cutoff that accessed 88% of the theoretical capacity, the observed capacity declined at only 0.14%/day (FIGS. 5A and 16A). By contrast, under more typical conditions with a 1.6 V cutoff that accessed 99.9% of the theoretical capacity, the observed capacity declined at 5.6%/day. Similar results were obtained by using identical potential conditions but with a coulombic cutoff to restrict the SOC range (FIG. 17). These observations demonstrate that operating conditions that access most, but not all, of the theoretical capacity greatly extend battery lifetime.

Figure 15:
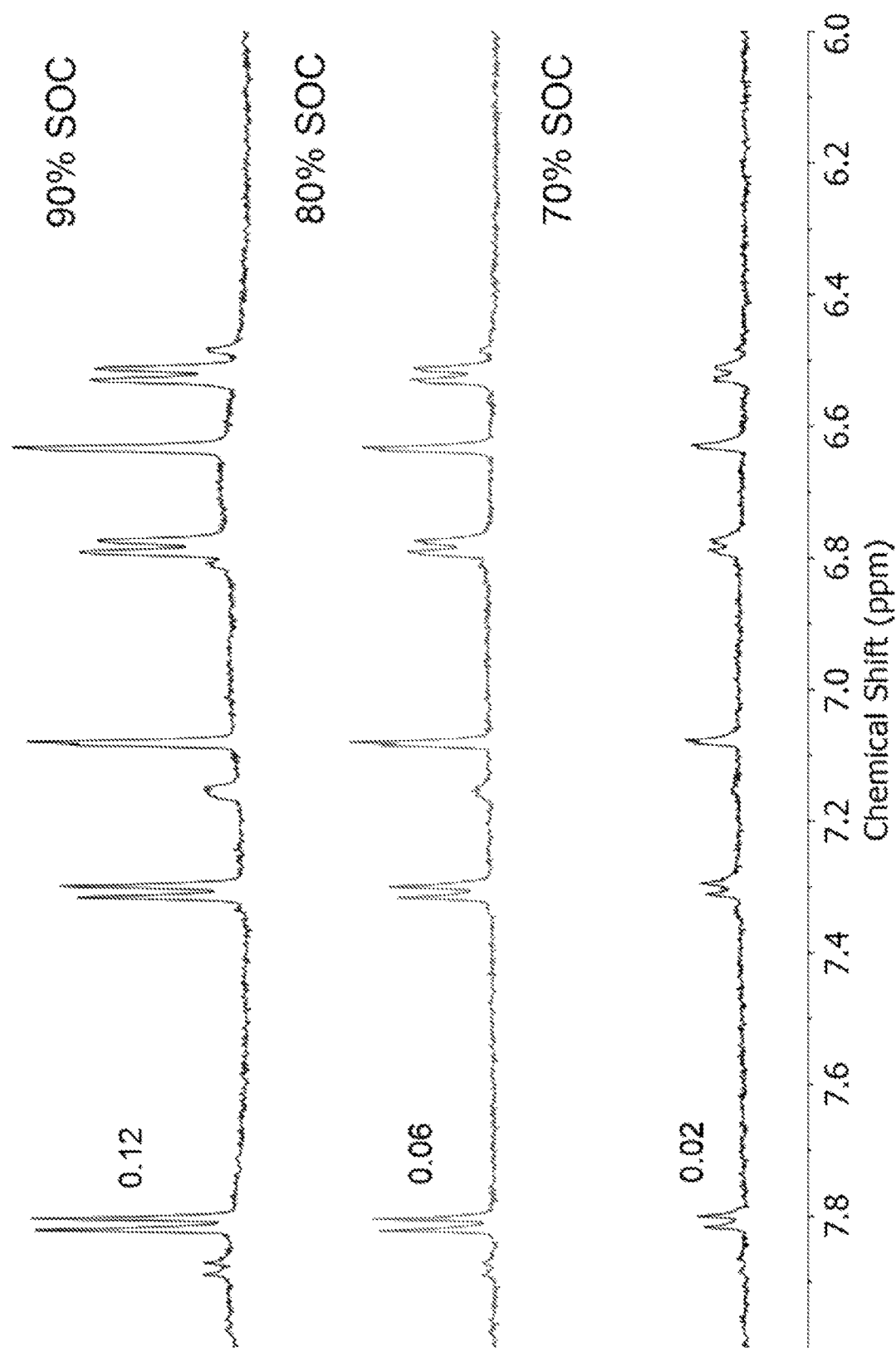
FIG. 15. Relative concentration of DHA at different SOC of DHAQ. Integration of signals with chemical shift of 7.8 ppm reflect the relative quantities of DHA vs a sodium methanesulfonate internal standard (δ 2.6 ppm, not shown).
Figure 16B:
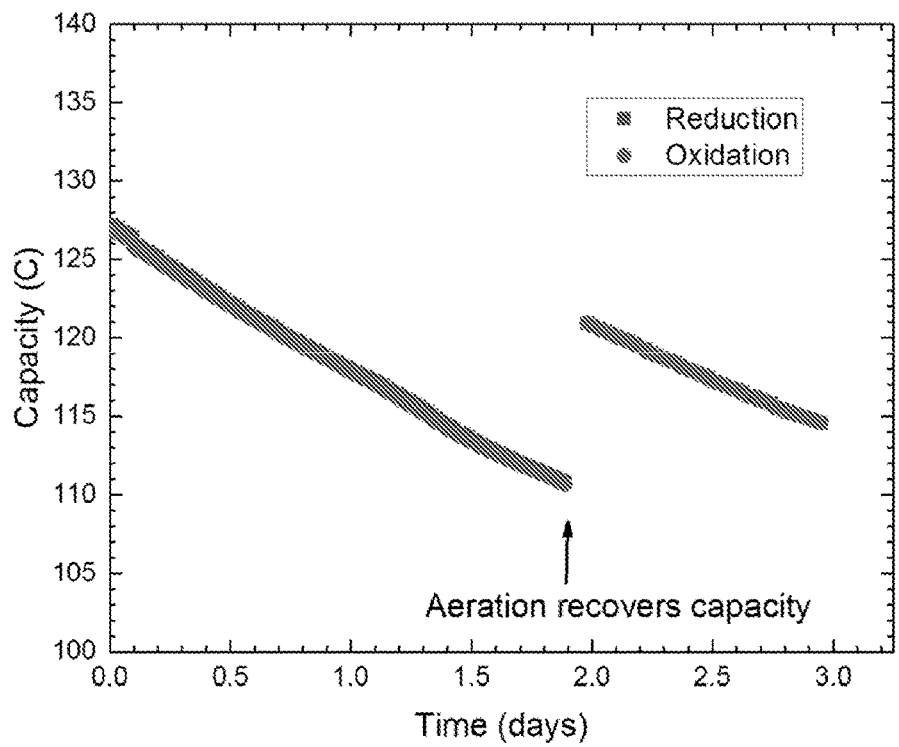
Figure 18:
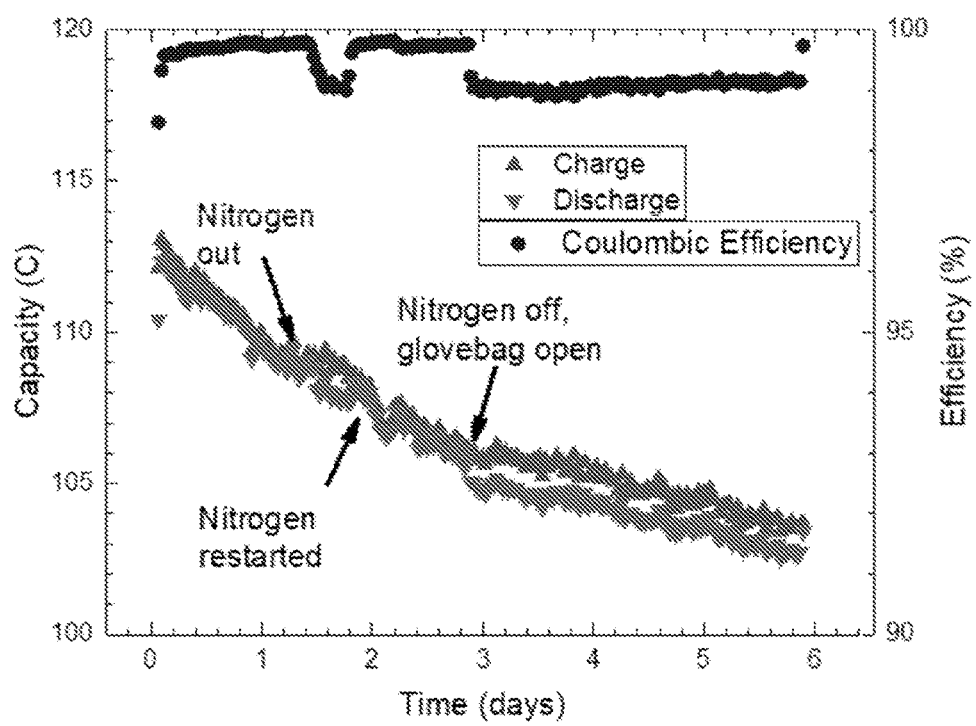
FIG. 18. Potentiostatic full cell cycling of 0.1 M DHAQ in a 1.2 M KOH solution vs 0.05 M K$_4$[Fe(CN)$_6$] in a nitrogen atmosphere (fade rate=2.8%/day) for 1 day, followed by an intermittent nitrogen atmosphere for 2 days due to dewar replacement, and then an ambient air environment (fade rate=0.75%/day) for the final 3 days.

The strategy of avoiding high states of charge reduces the amount of DHA formation and can eliminate it if less than ~60% states of charge are utilized (FIG. 15). To divert the remaining DHA from irreversible dimerization and prevent the associated loss of capacity, we used lower oxidation overpotentials to slow the rate of DHA dimerization. We then added molecular oxygen to favor the oxidation of DHA back to DHAQ over DHA dimerization (FIG. 1). We tested this strategy by symmetric cell cycling of a DHAQ electrolyte under anaerobic conditions within its full SOC range (0-99.9%) but with an oxidative overpotential of 200 mV. The capacity decreased by 13% (FIGS. 5B and 16B) over 2 days of cycling. At this point, the electrolyte was removed from the glovebox in the discharged (oxidized) state, aerated, and returned to service. This operation resulted in the recovery of approximately 70% of the lost capacity when cycling was resumed. In a large-scale flow battery, the same process might be made more effective by purging the DHAQ negolyte reservoir with air after each full discharge to exploit the high DHAQ recovery rate at low DHA concentrations. Aeration could be optimized to match the DHA concentration to avoid unnecessary current efficiency loss (FIG. 18).

Our findings establish that the progressive loss of capacity in a DHAQ-based flow battery is primarily due to anthrahydroquinone disproportionation followed by irreversible anthrone dimerization.

We have also shown that the loss of battery capacity can largely be ameliorated by avoiding high states of charge and by negolyte aeration. We estimate that the combination of these two strategies would reduce the capacity fade rate of anthraquinone-based flow batteries by approximately 2 orders of magnitude, from 5.6%/day to (0.3)(0.14%/day) =0.042%/day. These modified operating procedures should not substantially increase the estimated large-scale capital cost (~$20/kWh for the DHAQ negolyte). By comparison, the United States Department of Energy has set a $150/kWh goal for grid-based energy storage systems. With further optimization of the battery operating conditions, this goal may be attained in the near future.

Cell Cycling

All flow cell cycling tests were performed with a 5 cm$^2$ cell (Fuel Cell Tech, Albuquerque, N. Mex.) equipped with POCO sealed graphite flow plates with serpentine flow fields. Each side of the cell contained a stack of four sheets of Sigracet SGL 39AA porous carbon paper that had been pretreated by baking in air at 400° C. for 24 h. In all cases, the cell was assembled with a Nafion N117 membrane that had been pretreated by immersion in a 1 M KOH aqueous solution for at least 72 hours. In all cases, Viton (PVDF) gaskets were used to seal the electrodes between the membranes and graphite flow fields. Flow of electrolytes was forced with a Cole-Parmer Masterflex L/S peristaltic pump, which required a small length of Viton peristaltic tubing. All other tubing and electrolyte reservoirs were made from chemically resistant fluorinated ethylene propylene (FEP).

Potentiostatic cycling of all volumetrically-unbalanced compositionally-symmetric cells was performed in a glovebox with <2 ppm of oxygen with a Biologic VSP 300 potentiostat. Unless otherwise specified, the potential limits were set to ±200 mV to access >99% of the available DHAQ capacity. As explained below, the oxidation potential was increased to +350 mV in some cases in order to oxidize any DHA present in the electrolyte. Due to the starting 50% SOC, these potential limits can be considered similar to overpotentials being divided for each side of the cell. In all symmetric cells, the non-capacity-limiting side comprised twice the volume of 50% SOC electrolyte as the capacity-limiting side. For example, if the capacity-limiting side contained 5 mL of 50% SOC 0.1 M DHAQ/DHAHQ and 1.2 M KOH, then the non-capacity-limiting side contained 10 mL of the same electrolyte. Due to these unbalanced volumes, the overpotentials are not split exactly evenly between the capacity-limiting and non-capacity-limiting sides of the cell.

Electrolyte Preparation

Unless otherwise specified, DHAQ electrolytes were prepared as aqueous solutions at 0.1 M concentration with 1.2 M KOH in order to deprotonate the DHAQ and afford a pH 14 solution. For symmetric cell testing, this electrolyte was charged in a full cell against potassium ferrocyanide until the current decayed to a steady state value less than 1 mA cm$^{-2}$ and was then mixed in equal proportions with uncharged material in order to make a 50% SOC electrolyte.

$^1$H NMR Spectroscopy

Unless otherwise specified, NMR analysis of cycled electrolytes was performed by diluting 80 µL of the DHAQ electrolyte in 720 µL of D$_2$O containing approximately 10 mM of sodium methanesulfonate (δ 2.6 ppm) as an internal standard. Spectra were recorded on a Varian INOVA 500 MHz spectrometer unless otherwise specified.

Capacity Fade of DHAQ Symmetric Cell

FIG. 6 depicts results of a volumetrically-unbalanced compositionally-symmetric cell cycling experiment performed potentiostatically with overpotentials of ±200 mV, accessing >99% of the theoretical DHAQ capacity. Cycling was continued for several days (363 cycles) in order to achieve significant capacity loss and perform post-mortem electrolyte analysis. A fade rate of approximately 8%/day was observed in this experiment.

Identification of DHA

The capacity-limiting electrolyte was collected after several days of further cycling with a +200 mV oxidation overpotential. Initial HPLC-MS analysis suggested primarily one major compound in addition to DHAQ, namely 2,6-dihydroxyanthrone (DHA). To verify the identification of DHA as the major side-product of DHAQ cell cycling at this potential, DHA was synthesized and confirmed to have the same retention time in HPLC-MS. In addition, NMR spectroscopy was also performed on a mixture of synthesized DHA and DHAQ to simulate the cycled electrolyte. The NMR spectrum of DHA-spiked DHAQ qualitatively matches the spectrum of discharged cycled DHAQ.

Oxidation of DHA

Figure 7A:
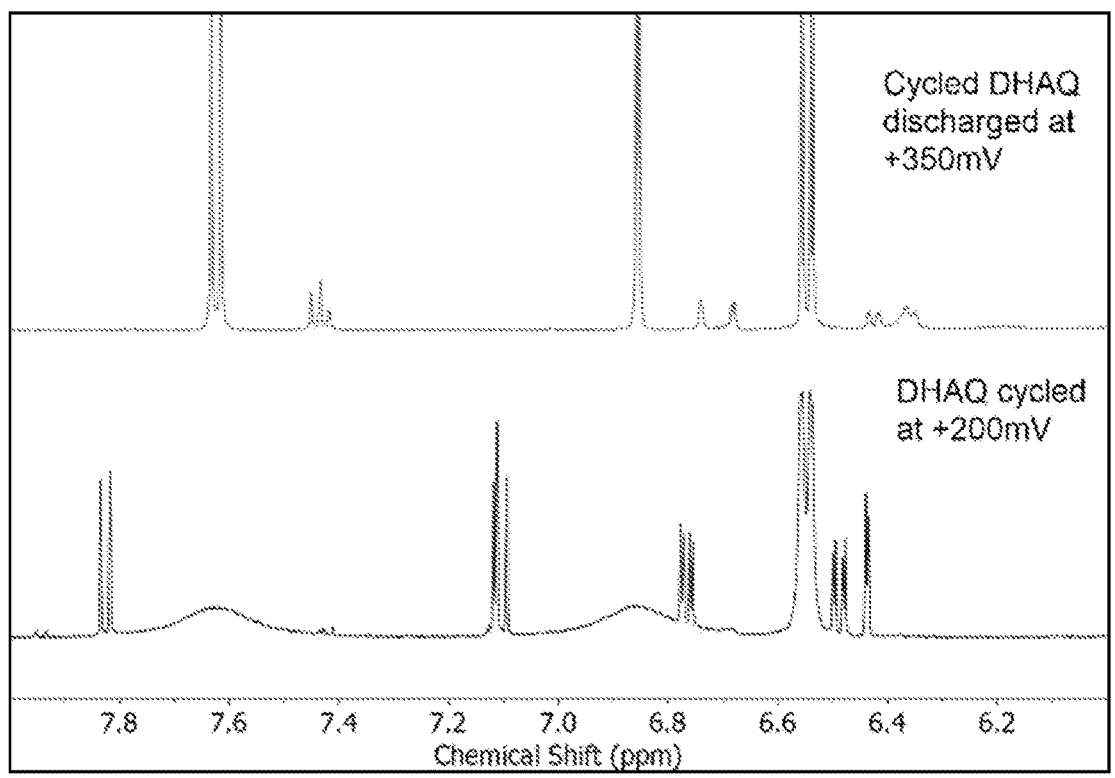
FIGS. 7A-7B. A. $^1$H NMR spectra (500 MHz, D$_2$O) of a sample of cycled DHAQ electrolyte discharged at +200 mV oxidation overpotential (bottom spectrum) and at +350 mV oxidation overpotential (top spectrum). B. $^1$H NMR spectra (500 MHz, D$_2$O) of a sample of synthetic DHA before aeration (bottom spectrum) and after aeration (top spectrum).
Figure 7B:
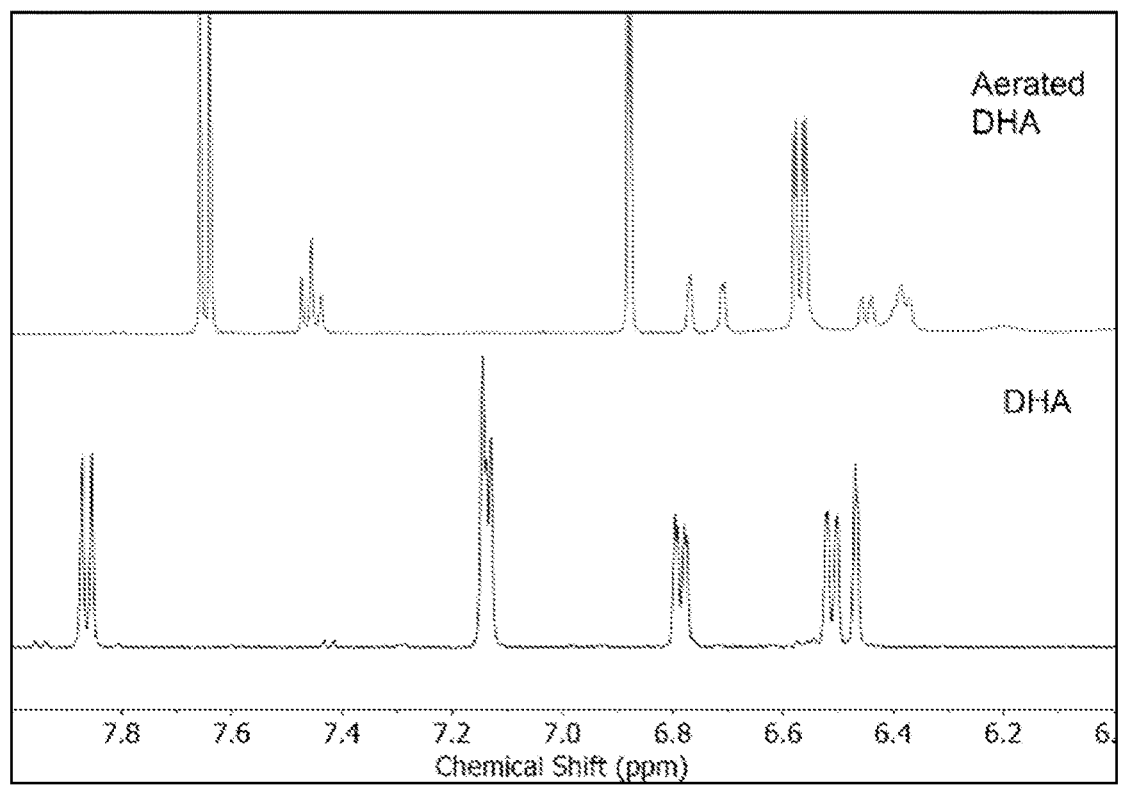

A sample of cycled DHAQ electrolyte was discharged at +200 mV overpotential; the $^1$H NMR spectrum revealed peaks matching those of DHA and broad peaks matching those of DHAQ (FIG. 7A, bottom spectrum). When the same electrolyte was discharged at +350 mV, the $^1$H NMR spectrum revealed sharp (rather than broad) peaks matching those of DHAQ and peaks later confirmed to match those of $(DHA)_2$ but no peaks matching those of DHA (FIG. 7A, top spectrum). When a sample of synthetic DHA was chemically oxidized by aeration, the $^1$H NMR spectrum indicates that most of the DHA was converted to DHAQ and a smaller amount was converted to $(DHA)_2$ (FIG. 7B).

Formation and Detection of $(DHA)_2$

HPLC-MS of a cycled DHAQ electrolyte after a strongly oxidative discharge (+350 mV) was applied, showing disappearance of DHA and the appearance of new compounds with $[M-H]^-=449.1028$ and $[M-H]^-=223.0404$. A sample with $[M-H]^-$ of 449.1028 was isolated from the DHAQ electrolyte by pHPLC (preparative HPLC), and its mass and retention time were confirmed by LC-MS. The structures were subsequently assigned as $(DHA)_2$ stereoisomers by NMR. Following separation from the DHAQ electrolyte by pHPLC, the sample with $[M-H]^-$ of 449.1028 was dissolved in DMSO-$d_6$ and analyzed by NMR to confirm the chemical structures as $(DHA)_2$ stereoisomers.

Time-Dependence of DHA Formation

Figure 3:
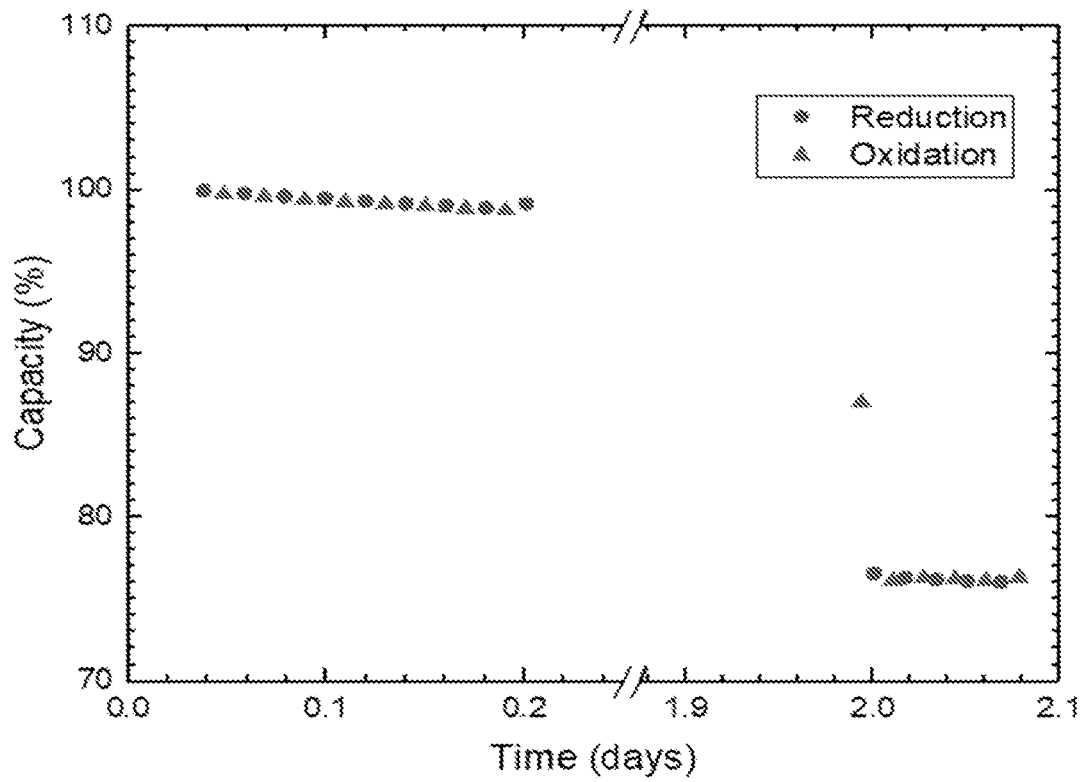
FIG. 3. Pausing redox cycling in the reduced state adversely affects battery capacity. Symmetric-cell cycling for 8 cycles, followed by a 43 h pause, leads to a large drop in capacity. The first oxidative discharge after the pause shows a transient amount of capacity corresponding to the conversion of accumulated DHA to (DHA)$_2$.

FIG. 8 depicts the fraction of DHA formed from a DHAQ electrolyte in three separate experiments, identical in protocol to the one of which results are depicted in FIG. 3 and in FIGS. 12A-14, but with different pause durations in each case. Taken together, these experiments suggest that the amount of DHA formed and the associated capacity loss both increase with the amount of time the DHAQ electrolyte is held in the reduced state of charge.

Synthesis of $(DHA)_2$ Via Electrochemical Oxidation of DHA

In a nitrogen-filled glovebox, an aqueous solution of 0.1 M synthetic DHA and 1.2 M KOH was prepared. An 80 μL aliquot was then dissolved in 720 μL of $D_2O$ within a sealed LPV NMR tube, and a $^1$H NMR spectrum was obtained within 1 hour (top spectrum). The DHA electrolyte was then electrochemically oxidized in a 5 cm$^2$ flow cell vs DHAQ. When the oxidation current fell below 5 mA, the cell was stopped, and another 80 μL aliquot was taken for $^1$H NMR analysis.

DHA was completely converted to $(DHA)_2$ by the electrochemical oxidation, as verified by comparison of the integrals of the $^1$H NMR signals with chemical shifts of 6-8 ppm, relative to that of a sodium methanesulfonate internal standard (δ 2.6 ppm).

Recovery of DHAQ Via Aeration of DHA

In a nitrogen-filled glovebox, an aqueous solution of 100 mM synthetic DHA, 1 M KOH, and a 67 mM sodium methanesulfonate internal standard was prepared. Six dilutions were prepared at 10 mM DHA by diluting 10-fold in 1 M KOD in $D_2O$, and six dilutions were prepared at 1 mM DHA by diluting 100-fold in 1 M KOD in $D_2O$. Two dilutions were prepared at 10 mM DHA and pH 13 by diluting 10-fold in $D_2O$. The two samples at 10 mM DHA and pH 13 were prepared in sealed LPV NMR tubes, and $^1$H NMR spectra were obtained. The remaining dilutions were removed from the glovebox, and samples at both DHA concentrations (10 mM and 1 mM) were oxidized by three different conditions (with two replicates performed for each condition): (1) by exposing the samples to air for several hours ("Open air"), (2) by repeatedly shaking and inverting the samples in air for less than one minute ("Air shaken"), and (3) by exposing the samples to pure oxygen from a gas tank ("$O_2$ bubbled"). The $^1$H NMR spectra of each of these samples were subsequently obtained, and in each, the signal matching a single DHAQ proton was integrated with respect to the internal standard. For each condition, the ratio of DHAQ formed relative to initial DHA was determined by dividing this integral by twice the integral of the signal corresponding to a single proton in the $^1$H NMR spectrum of unaerated DHA at pH 13 with respect to the internal standard. (The factor of two in the denominator reflects that the DHAQ proton signal corresponds to two equivalent protons, whereas the DHA proton signal corresponds to one. For each spectrum, the average integral of the two replicates was used, and the error bars in FIG. 9 correspond to the standard deviation for each condition.)

Concentration Effects on Capacity Fade

FIGS. 10A-10C depict results of an experiment in which a symmetric cell was initially cycled with 0.1 M DHAQ in a 1.2 M KOH solution, resulting in a fade rate of ~8%/day. The electrolyte was subsequently diluted 10× with 1 M KOH, some volume was removed, and cycling continued. At 0.01 M DHAQ, the cell fade was ~4.2%/day. The electrolyte was diluted 10× again with 1 M KOH, volume was again removed, and cycling continued. At 0.001 M DHAQ, the fade rate was ~1.9%/day. These differences could be due to either a decrease in the rate of disproportionation/DHA formation or due to a decrease in the dimerization rate.

Characteristics of $(DHA)_2$ Cycling

Figure 11B:
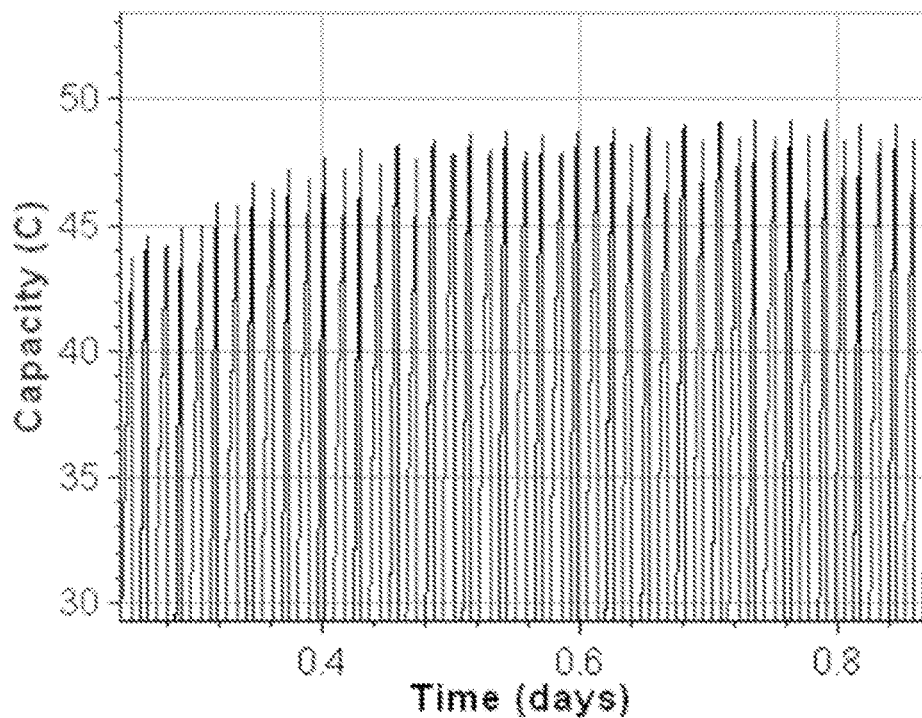

After the 0.1 M DHA electrolyte utilized in the experiment of which results are depicted in FIGS. 11A-11B was completely converted to 0.05 M $(DHA)_2$, this electrolyte of $(DHA)_2$ was cycled galvanostatically as a posolyte against a DHAQ negolyte, with potential holds at +700 mV and −300 mV. Within these potential limits, the accessed capacity of approximately 48 C corresponds to only 2 electrons transferred per molecule of $(DHA)_2$. Although more capacity may be accessed by an even greater oxidation overpotential (according to FIG. 2B), this would result in even greater voltage efficiency loss.

Stability of $(DHA)_2$

To monitor the stability of the $(DHA)_2$ dimers, an aqueous solution of 0.1 M DHA and 1.2 M KOH was prepared and aerated so that the DHA was converted to DHAQ and (DHA)$_2$. The $^1$H NMR spectrum of an 80 µL aliquot of the solution was obtained immediately after aeration. The electrolyte was then stored for 5 days, after which an $^1$H NMR spectrum of another aliquot was obtained, demonstrating a decrease in the integrals of the (DHA)$_2$ signals.

Figure 12A:
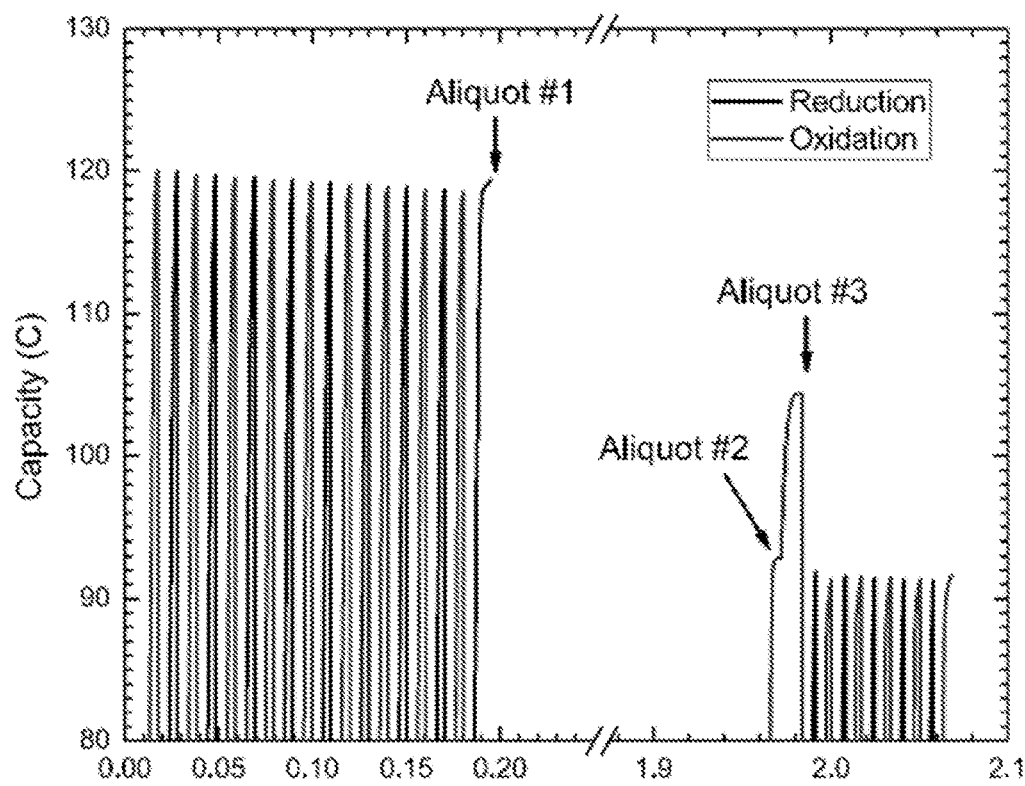
FIGS. 12A-12B. Capacity fade observed when redox cycling was paused in the reduced state of charge. Both figures depict the same data as depicted in FIG. 3 but plotted as (A) complete charge and discharge curves and (B) absolute capacity. After 8 cycles, cycling was stopped once the reduction current reached its limit, pumping was stopped with the electrolyte stored in its reservoir, and Aliquot #1 was removed (and immediately aerated). Cycling was resumed after 43 hours, and the first oxidative discharge after the pause was performed in two steps. First, the sample was discharged at +200 mV overpotential, at which point Aliquot #2 was removed, and then the discharge was continued at +350 mV until the current limit was reached, at which point Aliquot #3 was removed. The capacity accessed after this discharge was proportional to the remaining concentration of DHAQ (when adjusted for removal of the aliquots).
Figure 12B:
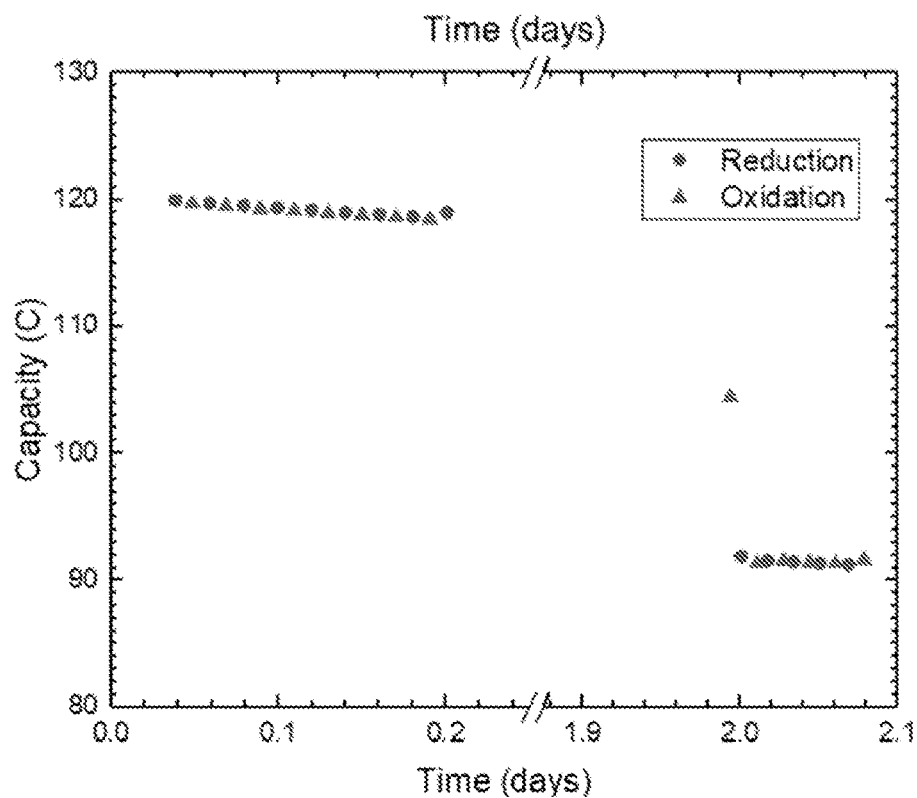
Figure 13:
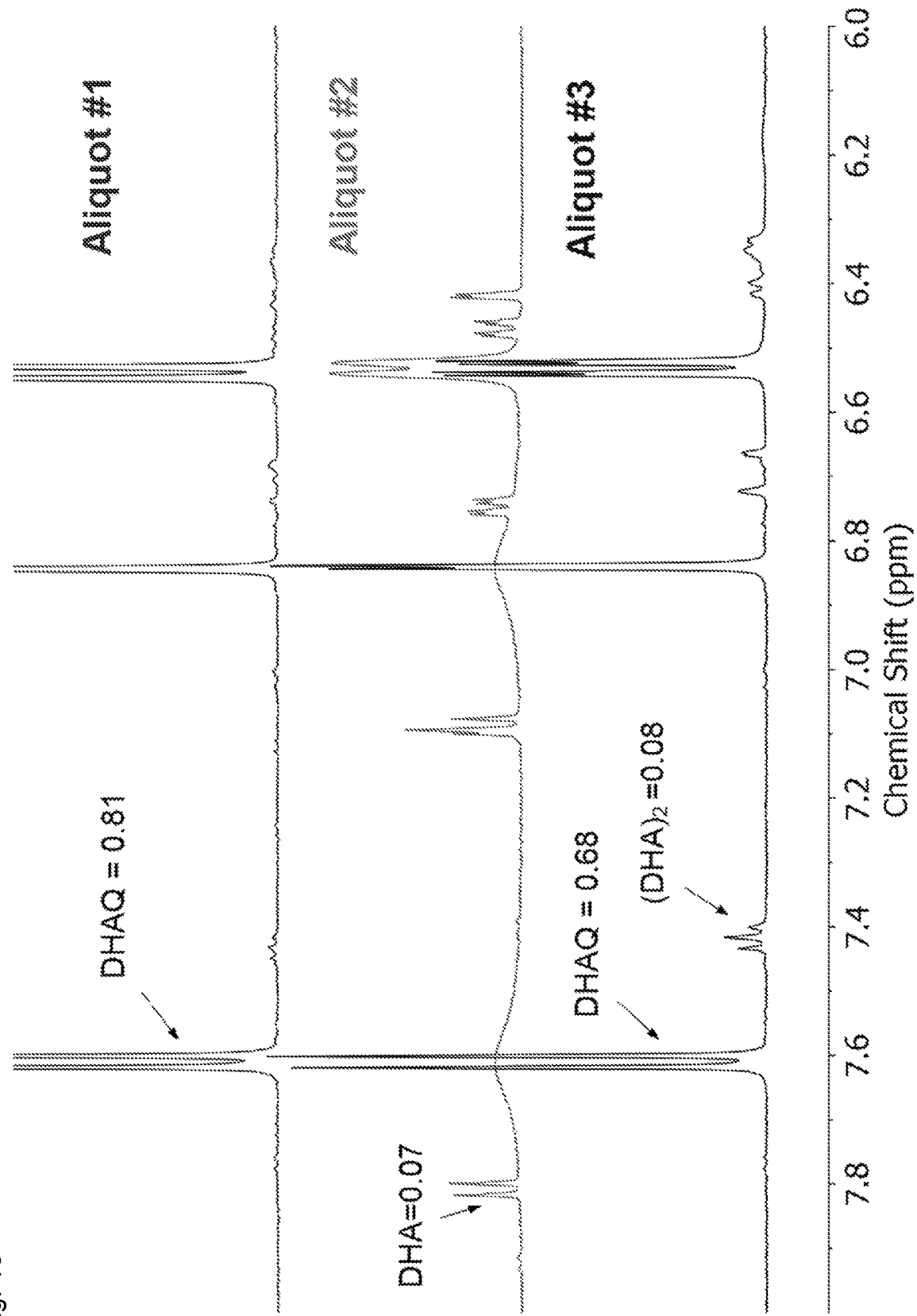
FIG. 13. Quantitative electrolyte species tracking by $^1$H NMR (aliquots defined in caption of FIG. 12), where numbers in black correspond to signal integrations relative to that of an internal standard of sodium methanesulfonate (δ 2.6 ppm, not shown). The integral of the DHA signal (one proton) with a chemical shift of 7.82 ppm is 0.07, whereas that of the DHAQ signal with a chemical shift of 7.62 ppm (two protons) has decreased by 0.13 after the DHA has been fully converted to (DHA)$_2$. Hence, the loss of DHAQ concentration is due to DHA formation. The (DHA)$_2$ signals with chemical shift near 7.42 ppm (two protons total for each dimer) have an integral of approximately 0.08 as well. Hence, all DHA appears to be electrochemically oxidized to (DHA)$_2$. From the initial spectrum to the final (DHA)$_2$ spectrum, nearly all protons in the region shown are conserved, demonstrating that the loss of DHAQ has been mass-balanced by conversion to DHA and subsequent conversion to (DHA)$_2$.
Figure 14:
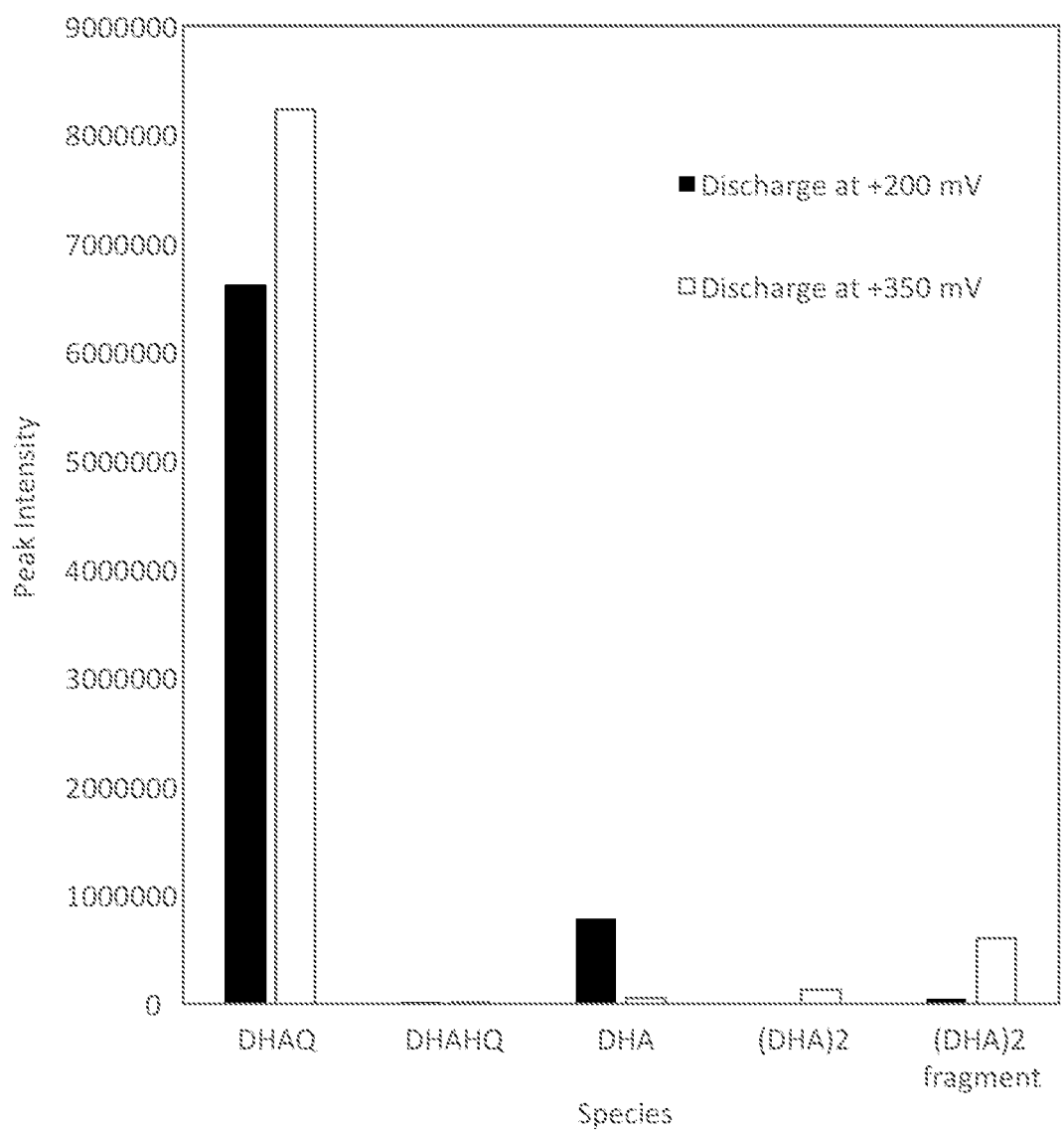
FIG. 14. Corroboration by HPLC-MS of quantitative $^1$H NMR analysis of electrolyte species depicted in FIG. 13. After discharging at +200 mV (blue), substantial amounts of DHA remain, whereas the DHAHQ has been fully converted to DHAQ. After discharging at +350 mV (orange), both (DHA)$_2$ and the fragment with [M−H]$^−$ of 223.04104 appear in substantial quantities.

Quantitative Analysis of DHA and (DHA)$_2$ Formation and Correlation with Capacity Loss FIG. 3 and FIGS. 12A-12B depict results of an experiment to quantitatively correlate the formation of DHA and subsequent dimerization with capacity loss, which demonstrates the formation of DHA when a DHAQ electrolyte was held in the reduced state of charge. An aliquot of electrolyte (Aliquot #1) was removed at the beginning of a pause in cycling. Though not shown due to scale, the first step after the pause is another reduction step involving 18 C (or 16% of the total capacity before the pause), consistent with the disproportionation reaction involving the oxidation of DHAHQ. In this case, the 43 hour pause in the reduced state of charge converted 16% of the DHAHQ into DHA before cycling was resumed. DHA was not oxidized by the first discharge cycle after the pause when +200 mV was applied (Aliquot #2) but was completely converted to (DHA)$_2$ when +350 mV was applied (Aliquot #3). Overall, the cycling capacity decreased by 27 C during the pause, a loss of 23%, corresponding to approximately 15% after correcting for the aliquots removed for $^1$H NMR analysis. This capacity loss correlates well with the 16% loss of DHAQ concentration and transient formation of DHA during the pause and with the conversion of DHA to (DHA)$_2$ thereafter (see FIG. 13). This experiment was repeated twice with different electrolyte samples utilizing 12 hour and 71 hour pauses. The DHAQ concentration loss measured by $^1$H NMR was 13% during the 12 hour pause and 17% during the 71 hour pause (see FIG. 8).

DHA Formation Vs State of Charge of DHAQ

The state of charge (SOC) limit of the DHAQ electrolyte was demonstrated to strongly influence the cycling capacity fade rate. To directly quantify the relationship between capacity fade rate and SOC limit, an aqueous electrolyte comprising 0.1 M DHAQ and 1.2 M KOH was charged in an oxygen-free glovebox to approximately 90, 80, 70, and 60% SOC (DHAHQ relative to total DHAQ+DHAHQ). Slow charging was performed potentiostatically at a minimal value of 1.25 V in order to avoid overcharging the electrolyte in proximity to the electrodes. In order to reach 90% SOC, the potential was increased to 1.3 V near the end of charge to reach the desired SOC. Within 1 hour of charging, aliquots were diluted with D$_2$O in sealed LPV NMR tubes, and the $^1$H NMR spectra were obtained without exposure to oxygen. The resulting spectra (FIG. 15) depict broadening of the peaks corresponding to DHAQ, whereas those corresponding to DHA are sharp and diminishing in area as the SOC is decreased (spectrum at 60% SOC not shown due to lack of quantifiable peaks). When quantified relative to a sodium methanesulfonate internal standard (δ 2.6 ppm, not shown), the amount of DHA observed at 70% SOC is approximately 33% and 16% of the amount observed at 80% and 90% SOC, respectively. Although an exact correspondence with a cycling fade rate cannot be established due to variable charging conditions and the time dependence of DHA formation, this result demonstrates the sensitivity of DHA formation to SOC and is consistent with the proposed disproportionation reaction described in the main text.

Potentiostatic Cycling with Coulombic SOC Cutoff

FIG. 17 depicts results of an experiment in which 1.6 V potentiostatic cycling was initially performed until the current was <2 mA/cm$^2$, corresponding to the first segment of the graph. The cell lost 10 C in 2 days of full cycling, corresponding to approximately 4.8% loss per day. Then, in the second segment of the graph, the same voltage (1.6 V) was applied for charging with a Coulomb cutoff set at 95 C (88% SOC based on the 107.8 C capacity from the end of the first segment). The cell was fully discharged every cycle at 0.6 V until the current was <2 mA/cm$^2$. The cell lost 2 C over 2 days. This number is calculated by the capacity at the end of the first segment minus the capacity at the beginning of third segment. Using 107.8 C as the initial value, this represents approximately 0.8%/day, much less than 4.8% loss per day, which demonstrates the effect of SOC control. Although the SOC range is similar to that shown in FIG. 5A, the fade rate is higher in this case. We hypothesize that the fast charging rate due to the 1.6 V potentiostatic condition creates a local SOC gradient near the electrodes and in the tubing, which exceeds the target SOC and therefore accelerates the decomposition.

Cycling of DHAQ Under Aerobic Conditions

Figure 5B:
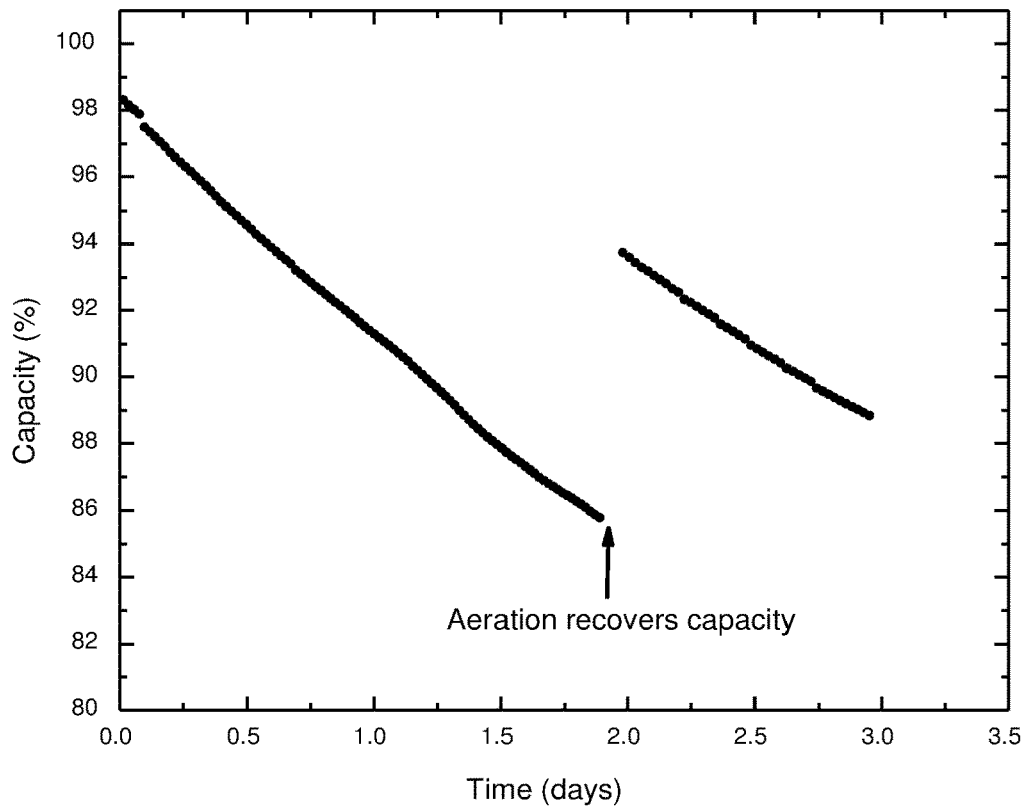

As described in the main text, DHAQ capacity recovery can be achieved by aeration of the electrolyte. Alternatively, this strategy could be achieved by operation of the flow battery in an open-air environment, which also achieves a lower capacity fade rate and is demonstrated in FIG. 18. In this case, the 'protective' effect of oxygen may be due to the aeration of DHA and recovery of DHAQ, as previously demonstrated, but may also be due to the oxidation of DHAHQ, which would decrease the accessed SOC and, correspondingly, the driving force for DHA formation. In either case, this method comes at a performance cost because it engenders a loss of current efficiency due to the continuous oxidation of the negolyte. For this reason, the method of aeration after discharge demonstrated in FIG. 5B is preferable and could be achieved most effectively in an industrial application by adding an oxygen treatment step after each discharge of the electrolyte.

Theoretical Investigation of Anthrone Formation Susceptibility

Figure 4:
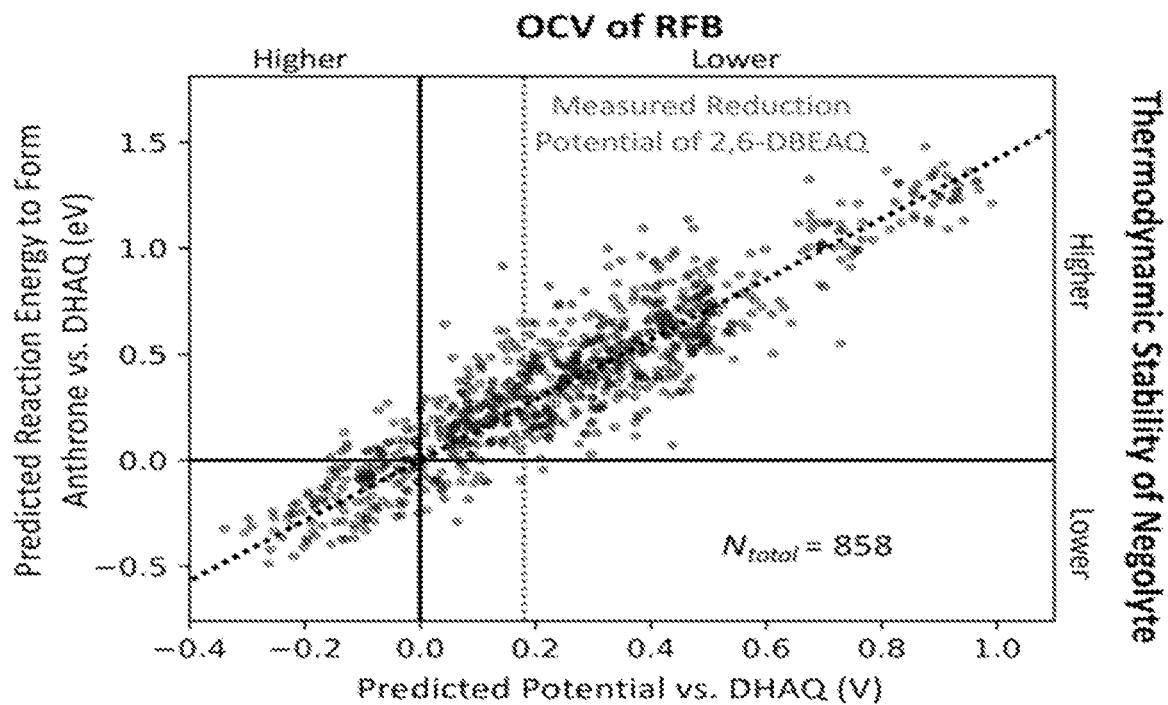
FIG. 4. Trade-off between the reduction potential of the quinone-hydroquinone couple and the thermodynamic stability of the hydroquinone form toward anthrone formation (N$_{total}$=858 quinones). The mean absolute error of the predicted DHAQ potentials is ~0.07 V.

The values plotted in FIG. 4 were generated as follows. For a set of para-quinone molecules taken from Tabor et al. *ChemRxiv* 2018, DOI: 10.26434/chemrxiv.6990053.v2, all possible anthrone forms were generated. For each molecule, up to 20 conformers were generated using the RDKit; these were optimized at the PM7 COSMO level of theory. We then calculated the energy difference of the lowest energy anthrone form and the hydroquinone form and report this energy relative to that of DHAHQ→DHA.

What is claimed is:

1. A method of discharging a battery comprising the steps of:
   a) providing a flow battery comprising a negolyte comprising an anthrahydroquinone in aqueous solution or suspension in contact with a first electrode, a posolyte comprising a redox active species in contact with a second electrode, and a barrier separating the negolyte and posolyte; and
   b) discharging the flow battery so that the anthrahydroquinone is oxidized to an anthraquinone and the redox active species is reduced, wherein an oxidizing agent is provided to the discharged negolyte.

2. The method of claim 1, wherein the anthraquinone is of formula (I):

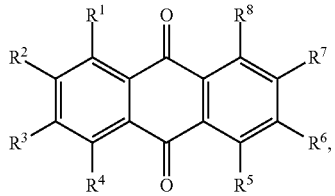

wherein each of $R^1$, $R^2$, $R^3$, $R^4$, $R^5$, $R^6$, $R^7$ and $R^8$ is independently selected from H; halo; optionally substituted $C_{1-6}$ alkyl; oxo; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; —CN; —NO$_2$; —OR$_a$; —SR$_a$; —N(R$_a$)$_2$; —C(=O)R$_a$; —C(=O)OR$_a$; —S(=O)$_2$R$_a$; —S(=O)$_2$OR$_a$ (e.g., SO$_3$H); —P(=O)R$_{a2}$; and —P(=O)(OR$_a$)$_2$; or any two adjacent groups selected from $R^1$, $R^2$, $R^3$, and $R^4$ are joined to form an optionally substituted 3-6 membered ring, or an ion thereof, wherein each R$_a$ is independently H; $C_{1-6}$ alkyl; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; an oxygen protecting group; or a nitrogen protecting group.

3. The method of claim 1, wherein the redox active species comprises bromine, chlorine, iodine, molecular oxygen, vanadium, chromium, cobalt, iron, aluminum, manganese, cobalt, nickel, copper, or lead.

4. The method of claim 1, wherein the oxidizing agent is molecular oxygen.

5. The method of claim 4, wherein the molecular oxygen is provided in gaseous form.

6. A flow battery comprising:
   i) a negolyte comprising an anthrahydroquinone in aqueous solution or suspension in contact with a first electrode;
   ii) a posolyte comprising a redox active species in contact with a second electrode;
   iii) a barrier separating the negolyte and posolyte; and
   iv) a source of oxidizing agent in fluid communication with the negolyte and/or a gas dispersion element in the negolyte.

7. The flow battery of claim 6, wherein the anthraquinone is of formula (I):

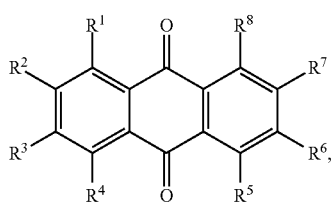

wherein each of $R^1$, $R^2$, $R^3$, $R^4$, $R^5$, $R^6$, $R^7$ and $R^8$ is independently selected from H; halo; optionally substituted $C_{1-6}$ alkyl; oxo; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; —CN; —NO$_2$; —OR$_a$; —SR$_a$; —N(R$_a$)$_2$; —C(=O)R$_a$; —C(=O)OR$_a$; —S(=O)$_2$R$_a$; —S(=O)$_2$OR$_a$ (e.g., SO$_3$H); —P(=O)R$_{a2}$; and —P(=O)(OR$_a$)$_2$; or any two adjacent groups selected from $R^1$, $R^2$, $R^3$, and $R^4$ are joined to form an optionally substituted 3-6 membered ring, or an ion thereof, wherein each R$_a$ is independently H; $C_{1-6}$ alkyl; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; an oxygen protecting group; or a nitrogen protecting group.

8. The flow battery of claim 6, wherein the redox active species comprises bromine, chlorine, iodine, molecular oxygen, vanadium, chromium, cobalt, iron, aluminum, manganese, cobalt, nickel, copper, or lead.

9. A method of reducing loss of capacity in a flow battery comprising the steps of:
   a) providing a flow battery comprising a negolyte in aqueous solution or suspension in contact with a first electrode, a posolyte in contact with a second electrode, and a barrier separating the negolyte and posolyte; and
   b) oxidizing the negolyte after discharge, wherein the oxidizing agent is molecular oxygen.

10. The method of claim 9, wherein the negolyte comprises an organic redox active compound or an organometallic redox active compound.

11. The method of claim 9, wherein the negolyte comprises an anthraquinone.

12. The method of claim 11, wherein the anthraquinone is of formula (I):

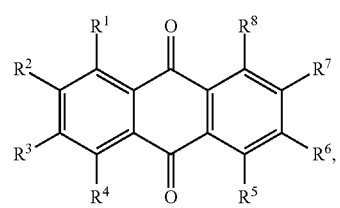

wherein each of $R^1$, $R^2$, $R^3$, $R^4$, $R^5$, $R^6$, $R^7$ and $R^8$ is independently selected from H; halo; optionally substituted $C_{1-6}$ alkyl; oxo; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; —CN; —NO$_2$; —OR$_a$; —SR$_a$; —N(R$_a$)$_2$; —C(=O)R$_a$; —C(=O)OR$_a$; —S(=O)$_2$R$_a$; —S(=O)$_2$OR$_a$ (e.g., SO$_3$H); —P(=O)R$_{a2}$; and —P(=O)(OR$_a$)$_2$; or any two adjacent groups selected from $R^1$, $R^2$, $R^3$, and $R^4$ are joined to form an optionally substituted 3-6 membered ring, or an ion thereof, wherein each R$_a$ is independently H; $C_{1-6}$ alkyl; optionally substituted $C_{3-10}$ carbocyclyl; optionally substituted $C_{1-9}$ heterocyclyl having one to four heteroatoms independently selected from O, N, and S; optionally substituted $C_{6-20}$ aryl; optionally substituted $C_{1-9}$ heteroaryl having one to four heteroatoms independently selected from O, N, and S; an oxygen protecting group; or a nitrogen protecting group.

13. The method of claim 9, wherein the posolyte comprises a redox active species comprises bromine, chlorine, iodine, molecular oxygen, vanadium, chromium, cobalt, iron, aluminum, manganese, cobalt, nickel, copper, or lead.

14. The method of claim 9, wherein the molecular oxygen is provided in gaseous form.

\* \* \* \* \*